US010409412B1

(12) United States Patent
Andre et al.

(10) Patent No.: US 10,409,412 B1
(45) Date of Patent: Sep. 10, 2019

(54) MULTI-INPUT ELEMENT FOR ELECTRONIC DEVICE

(71) Applicant: Apple Inc., Cupertino, CA (US)

(72) Inventors: Bartley K. Andre, Cupertino, CA (US); Mikael M. Silvanto, Cupertino, CA (US); Christiaan A. Ligtenberg, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/258,173

(22) Filed: Sep. 7, 2016

Related U.S. Application Data

(60) Provisional application No. 62/235,332, filed on Sep. 30, 2015.

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/023* (2013.01); *G06F 3/03547* (2013.01);
(Continued)

(58) Field of Classification Search
CPC .............................. G06F 3/021; G06F 3/0213
See application file for complete search history.

(56) References Cited

U.S. PATENT DOCUMENTS 5,212,356 A * 5/1993 English ................ H01H 13/702
200/5 A
5,748,177 A 5/1998 Baker et al.
(Continued)

FOREIGN PATENT DOCUMENTS

CN 1862732 11/2006
CN 101071354 11/2007
(Continued)

OTHER PUBLICATIONS

Rekimoto, Jun, "Thumbsense: Automatic Input Mode Sensing for Touch-Based Interactions," Interaction Laboratory, Sony Computer & Science Laboratories, Inc., 2 pages, Apr. 2003.

*Primary Examiner* — Dong Hui Liang
(74) *Attorney, Agent, or Firm* — Brownstein Hyatt Farber Schreck, LLP

(57) ABSTRACT

An electronic device utilizing an input component that is configured to receive various types of inputs is disclosed. The electronic device may include an enclosure including a top surface, a set of keys exposed on the top surface of the enclosure, and an input component. The input component may be a space bar included in the set of keys. Alternatively the input component may be a touchpad positioned adjacent the set of keys, which may not include a space bar. The input component is configured to receive or have various inputs performed thereon. The various inputs can include keypress inputs and touch-based gesture inputs. Additionally, the electronic device includes a process in electrical communication with the input component. The processing unit is configured to determine an input performed on the input component and subsequently provide a corresponding signal (e.g., keystroke signal, touch-based gesture signal) to the electronic device.

19 Claims, 11 Drawing Sheets

(51) Int. Cl.
*G06F 3/0354* (2013.01)
*G06F 3/023* (2006.01)

(52) U.S. Cl.
CPC .... *G06F 3/044* (2013.01); *G06F 2203/04104* (2013.01); *G06F 2203/04105* (2013.01)

(56) References Cited

U.S. PATENT DOCUMENTS

| | | | |
|---|---|---|---|
| 5,920,303 | A | 7/1999 | Baker et al. |
| 6,029,214 | A | 2/2000 | Dorfman et al. |
| 6,429,846 | B2 | 8/2002 | Rosenberg et al. |
| 6,822,640 | B2 | 11/2004 | Derocher |
| 7,683,890 | B2 | 3/2010 | Geaghan |
| 7,834,855 | B2 | 11/2010 | Hotelling et al. |
| 7,901,991 | B2 | 3/2011 | Bonucci et al. |
| 8,063,893 | B2 * | 11/2011 | Rosenberg ............... A63F 13/06 345/173 |
| 8,098,233 | B2 | 1/2012 | Hotelling et al. |
| 8,321,810 | B2 | 11/2012 | Heintze |
| 8,335,996 | B2 | 12/2012 | Davidson et al. |
| 8,378,975 | B2 | 2/2013 | Yoon et al. |
| 8,381,118 | B2 | 2/2013 | Minton |
| 8,390,481 | B2 | 3/2013 | Pance et al. |
| 8,432,362 | B2 | 4/2013 | Cheng et al. |
| 8,436,816 | B2 | 5/2013 | Leung et al. |
| 8,441,790 | B2 | 5/2013 | Pance et al. |
| 8,502,800 | B1 | 8/2013 | Vier et al. |
| 8,537,132 | B2 | 9/2013 | Ng et al. |
| 8,537,140 | B2 | 9/2013 | Tsai et al. |
| 8,570,280 | B2 | 10/2013 | Stewart et al. |
| 8,642,908 | B2 | 2/2014 | Moran et al. |
| 8,654,524 | B2 | 2/2014 | Pance et al. |
| 8,743,083 | B2 | 6/2014 | Zanone et al. |
| 8,766,922 | B2 | 7/2014 | Kim et al. |
| 8,782,556 | B2 | 7/2014 | Badger et al. |
| 8,804,347 | B2 | 8/2014 | Martisauskas |
| 8,854,325 | B2 | 10/2014 | Byrd et al. |
| 8,870,812 | B2 | 10/2014 | Alberti et al. |
| 8,952,899 | B2 | 2/2015 | Hotelling |
| 9,019,207 | B1 * | 4/2015 | Hamburgen ............ G06F 1/1662 345/156 |
| 9,063,627 | B2 | 6/2015 | Yairi et al. |
| 9,098,120 | B2 | 8/2015 | Huh |
| 9,104,282 | B2 | 8/2015 | Ichikawa |
| 9,116,616 | B2 | 8/2015 | Kyprianou et al. |
| 9,122,330 | B2 | 9/2015 | Bau et al. |
| 9,195,354 | B2 | 9/2015 | Bulea et al. |
| 9,201,105 | B2 | 12/2015 | Iida et al. |
| 9,250,738 | B2 | 2/2016 | Sharma |
| 9,367,146 | B2 | 6/2016 | Piot et al. |
| 9,367,158 | B2 | 6/2016 | Hotelling et al. |
| 9,460,029 | B2 | 10/2016 | Shaw et al. |
| 9,542,097 | B2 | 1/2017 | Ganey et al. |
| 9,543,948 | B2 | 1/2017 | Curtis et al. |
| 9,635,267 | B2 | 4/2017 | Lee et al. |
| 9,753,569 | B2 | 9/2017 | Han et al. |
| 9,847,505 | B2 | 12/2017 | Chida |
| 10,067,628 | B2 | 9/2018 | Kuscher et al. |
| 10,098,198 | B2 | 10/2018 | Huebner et al. |
| 2004/0104894 | A1 | 6/2004 | Tsukada et al. |
| 2004/0257345 | A1 | 12/2004 | Makanae et al. |
| 2006/0109252 | A1 * | 5/2006 | Kolmykov-Zotov ........................ G06F 3/03545 345/173 |
| 2007/0076859 | A1 | 4/2007 | Tzvetanov |
| 2008/0018611 | A1 | 1/2008 | Serban et al. |
| 2008/0055259 | A1 | 3/2008 | Plocher et al. |
| 2008/0266143 | A1 * | 10/2008 | Ohshita ............... G06F 3/016 341/22 |
| 2008/0272927 | A1 | 11/2008 | Woolley et al. |
| 2009/0225052 | A1 * | 9/2009 | Liu .......................... G06F 3/021 345/173 |
| 2010/0033354 | A1 | 2/2010 | Ejlersen |
| 2010/0265183 | A1 | 10/2010 | Mail et al. |
| 2010/0271315 | A1 | 10/2010 | Bathiche |
| 2010/0283741 | A1 | 11/2010 | Heintze et al. |
| 2011/0069021 | A1 | 3/2011 | Hill |
| 2011/0109575 | A1 * | 5/2011 | Lii ........................ G06F 3/0481 345/173 |
| 2011/0316774 | A1 * | 12/2011 | Clifton ................ G06F 3/03547 345/157 |
| 2012/0001852 | A1 | 1/2012 | Ho et al. |
| 2012/0068933 | A1 | 3/2012 | Larsen |
| 2012/0212443 | A1 * | 8/2012 | Tomimori ............. G06F 1/1616 345/173 |
| 2013/0002534 | A1 | 1/2013 | Braun et al. |
| 2013/0021256 | A1 | 1/2013 | Manzen |
| 2014/0043289 | A1 | 2/2014 | Stern et al. |
| 2014/0317564 | A1 * | 10/2014 | Odell .................... G06F 3/0482 715/810 |
| 2014/0347312 | A1 | 11/2014 | Siska |
| 2014/0368455 | A1 | 12/2014 | Croisonnier et al. |
| 2015/0123906 | A1 | 5/2015 | Mehandjiysky et al. |
| 2015/0297145 | A1 | 10/2015 | Luna et al. |
| 2015/0309589 | A1 | 10/2015 | Chang |
| 2016/0098107 | A1 | 4/2016 | Morrell et al. |
| 2016/0103496 | A1 | 4/2016 | Degner et al. |
| 2016/0147440 | A1 | 5/2016 | Leyon |
| 2016/0231856 | A1 | 8/2016 | Suwald et al. |
| 2017/0090594 | A1 | 3/2017 | Silvanto et al. |
| 2017/0090596 | A1 | 3/2017 | Silvanto et al. |
| 2017/0090597 | A1 | 3/2017 | Silvanto et al. |
| 2017/0090654 | A1 | 3/2017 | Silvanto et al. |
| 2017/0249072 | A1 | 8/2017 | Martin et al. |
| 2017/0315622 | A1 | 11/2017 | Morrell et al. |
| 2018/0011548 | A1 | 1/2018 | Garelli |
| 2018/0039376 | A1 | 2/2018 | Peterson et al. |
| 2019/0025954 | A1 | 1/2019 | Wang et al. |

FOREIGN PATENT DOCUMENTS

| | | |
|---|---|---|
| CN | 101482785 | 7/2009 |
| CN | 101609383 | 12/2009 |
| CN | 101644979 | 2/2010 |
| CN | 201563116 | 8/2010 |
| CN | 102171632 | 8/2011 |
| CN | 102200861 | 9/2011 |
| CN | 102844729 | 12/2012 |
| CN | 103164102 | 6/2013 |
| CN | 103176691 | 6/2013 |
| CN | 203260010 | 10/2013 |
| CN | 103384871 | 11/2013 |
| CN | 103455205 | 12/2013 |
| CN | 103577008 | 2/2014 |
| CN | 104423740 | 3/2015 |
| CN | 104834419 | 8/2015 |
| CN | 104915002 | 9/2015 |
| EP | 0189590 | 6/1986 |
| EP | 2305506 | 4/2011 |
| EP | 2664980 | 11/2013 |
| FR | 2980004 | 3/2013 |
| JP | 2001175415 | 6/2001 |
| TW | 200912612 | 3/2009 |
| TW | 201419112 | 5/2014 |
| WO | WO2007/032949 | 3/2007 |
| WO | WO2011/159519 | 12/2011 |
| WO | WO2014/124173 | 8/2014 |
| WO | WO2014/164628 | 10/2014 |

* cited by examiner

MULTI-INPUT ELEMENT FOR ELECTRONIC DEVICE

CROSS-REFERENCE TO RELATED APPLICATION(S)

This application is a nonprovisional patent application of U.S. Provisional Patent Application No. 62/235,332, filed Sep. 30, 2015 and titled "Multi-Input Element for Electronic Device," the disclosure of which is hereby incorporated herein by reference in its entirety.

FIELD

The disclosure generally relates to user input for an electronic device and, more particularly, to an electronic device that includes a space bar and a touchpad that are configured to receive various types of user input.

BACKGROUND

Conventional electronic devices typically include a variety of distinct input devices that are configured to receive a dedicated type of user input. For example, some conventional notebook or laptop computing devices include a keyboard and a touchpad, each configured to receive a different type of user input. In particular, keys of the keyboard may be configured to receive a keypress input, while the touchpad may be configured to receive touch input. In some traditional devices, a touch input may not be provided to the keys of a keyboard and/or keypress input may not be provided to the touchpad. There may be a lack of efficiency using these types of traditional systems as the user transitions between different types of input devices to provide different types of user input.

SUMMARY

Some example embodiments are directed to an electronic device. The electronic device comprises: an enclosure defining a top surface; a key extending through the top surface of the enclosure and configured to generate a first input when a force is exerted on the key; and a sensor associated with the key and operative to generate a second input when the key is touched.

Some example embodiments are directed to a method for providing various signals to an electronic device. The method comprises detecting an input performed on a key of an electronic device; determining if the input has a characteristic; in response to determining the input has a characteristic, processing the input as a first input type; and in response to determining the input does not have the characteristic, processing the input as a second input type.

Some example embodiments are directed to an electronic device. The electronic device comprises an enclosure defining a top surface; a set of keys exposed through the top surface, at least one key having a touch-sensitive key cap; a touch-sensitive surface positioned adjacent the set of keys and exposed through the top surface; and a processing unit in electrical communication with the touch-sensitive surface and the at least one key, the processing unit configured to: accept a first touch input from the at least one key; and accept a second touch input from the touch-sensitive surface.

Some example embodiments are directed to an electronic device. The electronic device comprises: a housing; a set of keys at least partially extending through the housing; a touch-sensitive surface at least partially extending through the housing; wherein the touch-sensitive surface extends into, and is partially encompassed by, the set of keys; and the touch-sensitive surface is operative to generate an input signal corresponding to a keypress in response to an input.

Some example embodiments are directed to a portable computing device including an enclosure defining a top surface and a set of keys extending through the top surface of the enclosure. The set of keys may include a key having a touch-sensitive surface. A touchpad may be positioned along the top surface and along a side of the set of keys. The touchpad may be configured to receive a first portion of a touch input initiated within an area of the touchpad. The key may be configured to receive a second portion of the touch input that extends into an area of the key. In some embodiments, the portable computing device is a notebook computing device, the set of keys defines an alpha-numeric keyboard, the key is a space bar key of the alpha-numeric keyboard, and the space bar is positioned adjacent to a side of the touchpad. In some implementations, the touch input is configured to control a cursor on a graphical user interface.

In some embodiments, the space bar includes a capacitive sensor array configured to detect a location of a touch on a surface of the space bar. The space bar may also include a force sensor configured to detect a force applied by the touch that exceeds a programmable threshold.

In some embodiments, the space bar is configured to invoke a keystroke command when the force applied by the touch exceeds an actuation threshold. In some cases, the programmable threshold is less than the actuation threshold. In some cases, the space bar is configured to actuate a dome switch when the touch exceeds the actuation threshold. In some cases, the actuation threshold is programmably defined.

In some embodiments, the touch-sensitive surface of the key defines multiple touch-sensitive regions. Each touch-sensitive region may be associated with a different function. In some embodiments, the multiple touch-sensitive regions define four quadrant regions of the key.

Some example embodiments are directed to a notebook computing device including an enclosure having an upper portion pivotally coupled to a lower portion, a display positioned in the upper portion of the enclosure, a touchpad positioned in the lower portion of the enclosure and configured to receive touch input, and a keyboard positioned along a side of the touchpad and including a space bar. The space bar may include a touch sensor configured to detect a location of a touch on a surface of the space bar and a force sensor configured to detect a force applied by the touch on the surface of the space bar.

In some embodiments, the notebook computing device is configured to: in response to the force exceeding a first threshold, initiating a touchpad press command; and in response to the force exceeding a second threshold, initiating a keystroke command.

In some embodiments, the notebook computing device is configured to determine if the touch is a keypress or gesture input. In accordance with a determination that the touch is a gesture input, the device may be configured to ignore an actuation of the space bar. In some cases, the determination is based on a duration of the touch on the surface of the space bar. In some cases, the determination is based on a duration since a previous keystroke was received by the keyboard.

Some example embodiments are directed to an electronic device including an enclosure, a set of keys positioned at least partially within the enclosure and defining a keyboard region, a first touch-sensitive surface within the keyboard region, and a second touch-sensitive surface extending beyond the keyboard region. The first and second touch-sensitive surfaces may be configured to detect a location of a touch and a magnitude of a force of the touch. In some embodiments, the set of keys forms at least a portion of an alpha-numeric keyboard, and the first touch-sensitive surface is configured to function as a space bar of the alpha-numeric keyboard.

In some embodiments, the electronic device is configured to: in response to the magnitude of the force exceeding a first threshold, initiate a touchpad press command, and in response to the magnitude of the force exceeding a second threshold, initiate a keystroke command. In some embodiments, the first and second touch-sensitive surfaces are configured to produce a non-binary output that corresponds to the magnitude of the force of the touch.

In some cases, the first touch-sensitive surface is operable to receive gesture input. The gesture input may invoke one or more of: a word-selection command, a line-selection command, or a multiple line-selection command.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
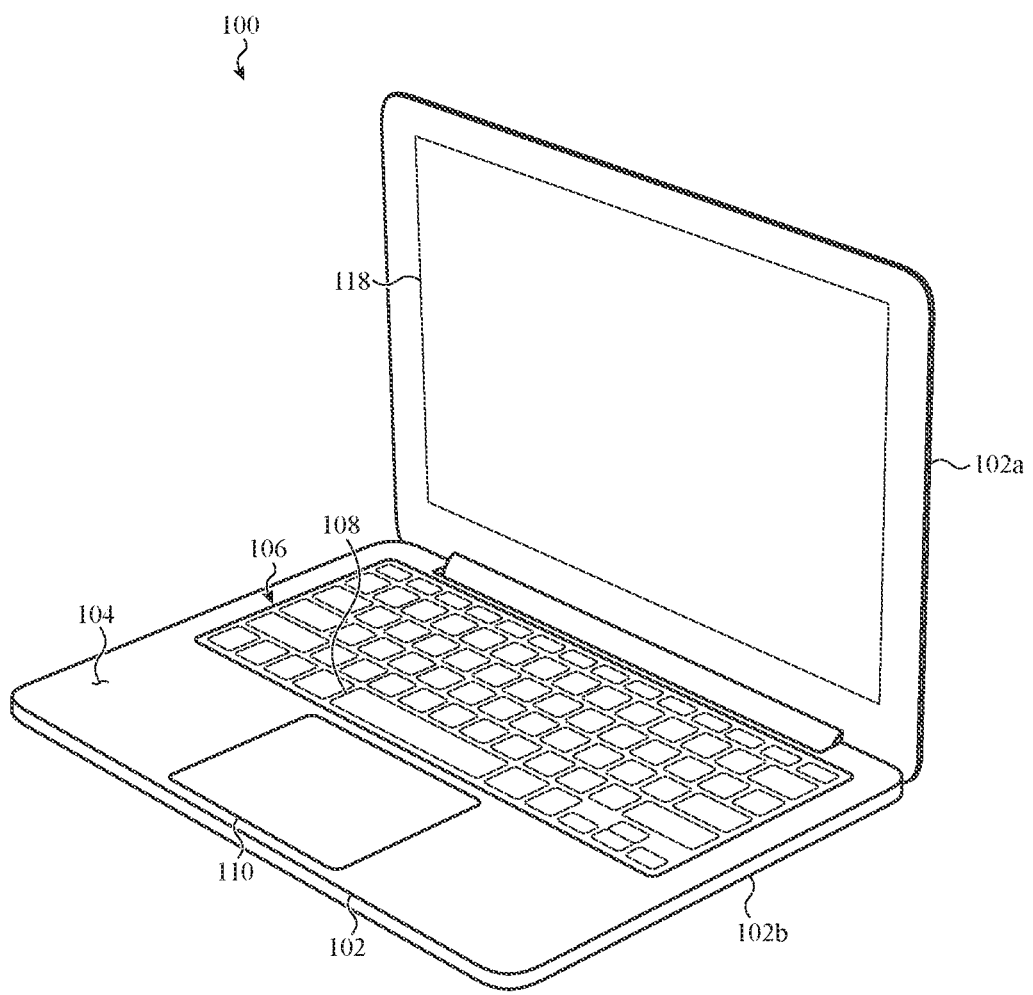
FIG. 1A depicts an electronic device including a key that is configured to receive various types of inputs.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices, and more particularly, to an electronic device that includes an input mechanism configured or configurable to receive various types of input. The examples provided in the following disclosure relate to a keyboard or a touchpad that is configured to receive different types of user input. Either the touchpad or the keys of a keyboard may generally be referred to herein as a "multi-input device."

In one example, a touch-sensitive and/or force-sensitive surface, such as a touchpad, may be configured to receive touch input and also accept keypress input that corresponds to an input provided by a key of a typical keyboard. In some cases, the touch-sensitive surface may extend into, and take the place of, one or more keys of a keyboard. In particular, the touchpad may extend into a part of a keyboard normally occupied by the space bar to provide an optimized keyboard layout. Touch or force input received on the region of the touch-sensitive surface extending into the keyboard may be treated as a press of a key that ordinarily occupies that region.

As another example, an electronic device includes a space bar configured to receive both keypress input and touch-based gesture inputs, which may be referred to as "touch inputs" or, if the space bar is force-sensitive, may be referred to as "force-touch inputs." In some cases, the space bar can be displaced to provide a keystroke command or signal to the electronic device. Additionally, the space bar can recognize a touch-based gesture, such as a finger(s) swipe, performed on or across a contact surface of the space bar. The space bar can receive these touch or force-touch inputs and provide a input signal to the electronic device.

Various examples described below are directed to an electronic device having a multi-input device, whether it is integrated into a space bar, touchpad, or other input device. By using a multi-input device, as described herein, a user of the electronic device may perform force-touch inputs on the space bar without removing his or her fingers from the keyboard. Additionally or alternatively, the user may provide keypress input using the touchpad. Either scenario may provide an advantage over some traditional devices. For example, a multi-input device may be beneficial for touch typists who rely on muscle memory and consistent finger placement on the keyboard because the typist does not have to remove his or her fingers from the keyboard to perform touch or force-touch input.

These and other embodiments are discussed below with reference to FIGS. 1A-12. However, those skilled in the art will readily appreciate that the detailed description given herein with respect to these Figures is for explanatory purposes only and should not be construed as limiting.

FIG. 1A depicts an example electronic device having a multi-input device in accordance with some embodiments. In particular, FIG. 1A depicts a laptop or notebook computing-type electronic device 100 that includes a space bar 108 that functions as a multi-input device. While FIG. 1A depicts an electronic device 100 as a laptop or notebook computing device, other example electronic devices may include a desktop computer, a keyboard device, a tablet computing device, a smartphone, a gaming device, a display device, and so on.

The electronic device 100 includes an input component, also referred to as a multi-input device, that is configured to receive and/or recognize keypress inputs, touch-based inputs, and/or force-based inputs, as described in more detail below. A "touch input" may refer to an input that corresponds to a touch or gesture on a touch-sensitive surface. A "force input" may refer to an input that corresponds to an amount of force applied to a surface. The force may be applied by a touch on the touch-sensitive surface using, for example, a finger or other object. As used herein, the term "force-touch input" may refer to an input that encompasses either or both touch inputs and force inputs.

With regard to force-touch input, the device 100 may be configured to produce an electrical output or perform a command in response to a touch having an applied force. It should be appreciated that embodiments described herein may detect, respond to, and output electrical signals corresponding to a continuum of forces. Embodiments may discriminate between multiple levels of force, and so are not necessarily limited to binary inputs. In this manner, embodiments may be different from conventional input devices such as keys, buttons, switches and the like that require a minimum force to close a circuit in order to generate an input.

In non-limiting examples, the multi-input device of the electronic device 100 can take the form of a space bar 108 or a touchpad 110. In general, the multi-input device is capable of recognizing and differentiating between multiple different input types, thereby permitting a user to perform keypress inputs and force-touch inputs on a single surface. In the following embodiments, the multi-input device (the space bar 108 and/or the touchpad 110) is positioned or arranged near the edge or periphery of a keyboard, which may facilitate user interaction with the multi-input device.

The multi-input device, touchpad, and/or keyboard may be integrated into an enclosure 102. The enclosure 102 may encompass and protect various internal components of electronic device 100. In the example of FIG. 1A, the enclosure 102 includes an upper portion 102a that is pivotally coupled to a lower portion 102b. The upper portion 102a includes a display 118 including, for example, a liquid-crystal display (LCD), organic light-emitting diode (OLED) display, or other display element. The lower portion 102b of the enclosure 102 includes a top surface 104 that may house, contain and/or include multiple input components (for example, a set of keys of a keyboard, a touchpad) for electronic device 100. Enclosure 102 may be formed from any suitable material that provides a protective casing or shell for electronic device 100 and the various components included in electronic device 100.

As shown in FIG. 1A, electronic device 100 also includes a set of keys 106 that form part of an alpha-numeric keyboard (hereafter, "set of keys 106" or "keys 106"). The set of keys 106 is positioned at least partially within and/or on enclosure 102 of electronic device 100. Specifically, the set of keys 106 is exposed through top surface 104 of the lower portion 102b of the enclosure 102. In a non-limiting example, the set of keys 106 includes space bar 108, amongst a variety of other keys. As discussed herein, each of the set of keys 106 (including space bar 108) can be pressed and/or otherwise displaced to provide an electrical input signal for electronic device 100. In general, pressing one of the set of keys 106 (including space bar 108) may be referred to as a keypress actuation and may result in a keypress command being performed or initiated.

Additionally, and as discussed below in detail with respect to FIGS. 1B-6B, space bar 108 is also configured to generate an electrical signal in response to a force-touch input. For example, the space bar 108 may be configured to actuate in response to a press or a force-touch input. In some cases, the space bar is configured to produce or invoke a keystroke command when actuated. The keystroke command may result in a typed space or other similar traditional keyboard function. In certain embodiments, other keys may also be so configured.

Further and as described herein, space bar 108 (or other keys) may cooperate with a touchpad 110 to form a multi-input device that is configured to invoke either a keystroke command or a touchpad-type command. The touchpad-type command may include a gesture, cursor control, or other functionality traditionally associated with the touchpad 110. As described in more detail below, the electronic device 100 may be configured to determine whether a force-touch input is intended to invoke a keystroke command or a touchpad-type command based on the context of the interaction with the electronic device 100.

Electronic device 100 also includes a touchpad 110. As shown in FIG. 1A, touchpad 110 is positioned adjacent or along a side of the space bar 108. Touchpad 110 of electronic device 100 is configured to receive force-touch inputs and to provide resulting signals to electronic device 100. The resulting signals may be used as an input by electronic device 100. In a non-limiting example, force-touch input performed on touchpad 110 results in a signal being sent to electronic device 100, which in turn uses that signal as an input. The force-touch input may be used to control the movement of a cursor of a graphical user interface. The force-touch input may also be used to indicate a gesture command or other touch-based command. A press on the touchpad 110 may also initiate or invoke a touchpad press command. A touchpad press command may result in selection of a graphic, icon, or other element of the graphical user interface. As discussed herein, any force-touch input typically performed on touchpad 110 can be performed, received, recognized and/or provided on or by space bar 108.

In some cases, the space bar 108 and touchpad 110 may function as a single input surface, even though the two are separate input devices and may be physically separated from one another. Generally, the space bar 108 may define a first touch-sensitive surface (within a keyboard region defined by the keys 106) and the touchpad 110 may define a second touch-sensitive surface (that extends beyond a keyboard region defined by the keys 106). The two touch-sensitive surfaces may be used to define a single or combined touch-sensitive region. For example, a touch input may be initiated within an area of the touchpad 110 but the touch input may continue or extend into the area of the space bar 108. In one instance, a first portion of the touch input may be received within the area of the touchpad 110 and a second portion of the touch input may be received within an area of the space bar 108, where the touch input may be completed.

Figure 1B:
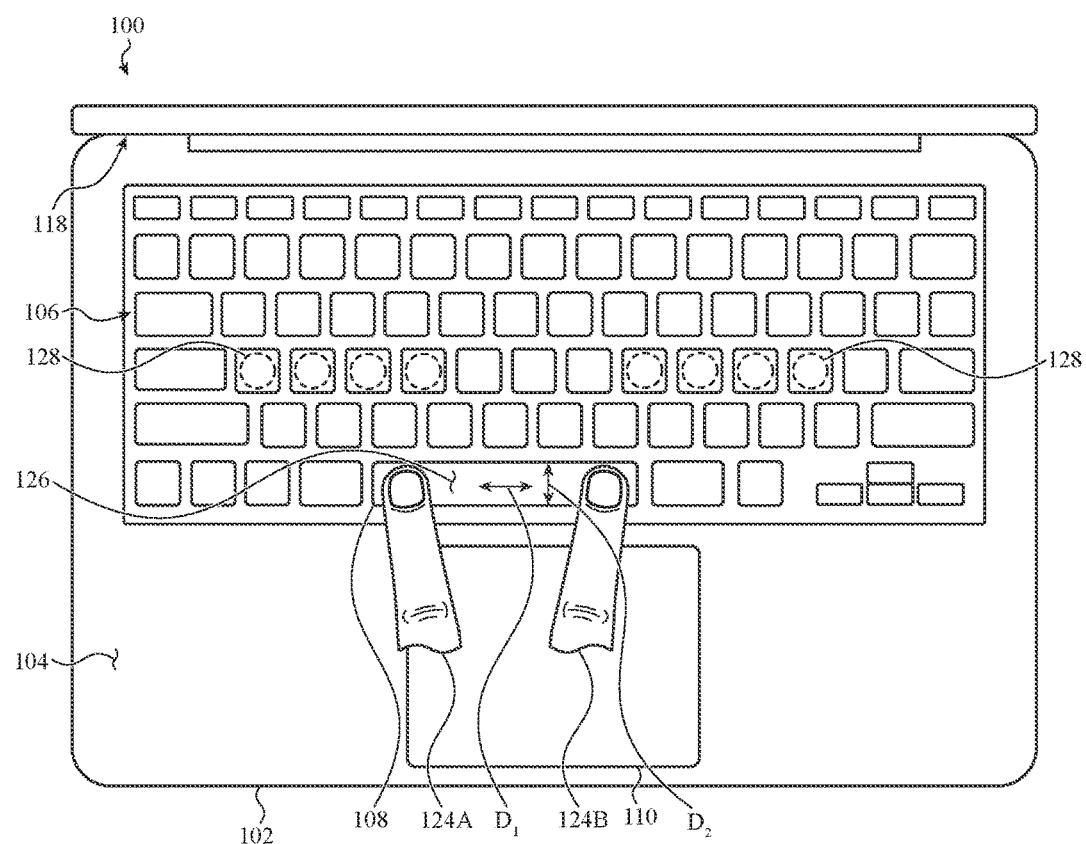
FIG. 1B depicts a user providing a touch-based gesture on the key of the electronic device of FIG. 1A.

FIG. 1B depicts a top view of electronic device 100 of FIG. 1A. As shown in FIG. 1B, electronic device 100 includes the keys 106, which form at least a portion of an alpha-numeric keyboard including the space bar 108. The space bar 108, as with the other keys, may actuate, depress, or otherwise move in response to a user-exerted force. In a non-limiting example, a key input or keystroke command is generated when a key (such as the space bar 108) is depressed. The space bar 108 may include an electrical switch that is actuated or closed in response to the movement of the space bar 108. The electrical switch may include a collapsible dome, pair of contacts, or other similar electrical switch. In some embodiments explained in more detail below, the actuation of the space bar 108 is accomplished using a non-binary force sensor or other sensor having a programmably defined make or actuation threshold.

The space bar 108 may include a touch sensor and/or a force sensor for detecting non-keypress input. For example, the space bar 108 may include a touch sensor configured to detect a location of a touch on the surface (a touch-sensitive surface) of the space bar 108. The space bar 108 may also include a force sensor that is configured to produce a non-binary output that corresponds to a magnitude of the force of the touch. Using the touch and/or force sensors, the space bar 108 may be used to receive force-touch inputs and subsequently provide corresponding signals similar to signals associated with the output of the touchpad 110. For example, the space bar 108 may be configured to detect a touch and/or force applied to its surface, even if that touch and/or force is insufficient to collapse the dome switch or other type of electrical switch used to detect a traditional keypress. The space bar 108 may also be configured to detect a touch and/or applied force that exceeds a force traditionally sufficient to collapse the dome or other electrical switch. In some cases, the space bar 108 may be configured to detect a range of force input. Further, the touch sensor of the space bar 108 may be used to track motion of an object (e.g., a finger) across the surface of the space bar 108. The motion may correspond to a cursor control, gesture command, or other touch-based commands.

FIG. 1B depicts on example force-touch input on a space bar 108. In the depicted example, fingers (including thumbs) 124A, 124B contact, touch and/or move on or over contact surface 126 of space bar 108. The movement of the fingers 124A, 124B may perform a force-touch input on space bar 108 to invoke a gesture command, cursor control, or other similar command. In the non-limiting example, the user's remaining fingers can be positioned on other keys 128 and may not move when the user provides force-touch input to the space bar. A sample position of the user's other fingers is shown as a set of dashed circles on certain of the keys 128.

Finger(s) 124A, 124B can move on contact surface 126 in a first direction ($D_1$), a second direction ($D_2$), or a combination of the two directions in sequence or simultaneously (e.g., diagonally) to provide touch-based gesture inputs. Further, virtually any object or component may be used to contact and move on space bar 108 to provide and/or perform a force-touch input on space bar 108, depending on the nature of the touch and/or force sensor(s) of the space bar 108.

In one example, the movement of the fingers 124A, 124B may be used to select text or invoke a text-selection command. Movement left or right in the first direction ($D_1$) may result in a word-selection command, a line-selection command, or multiple line-selection command depending on the location of a cursor and/or the amount of movement of one of the fingers 124A, 124B. A small movement to the right may result in a word-selection command. A larger movement to the right (or left) may result in a line-selection command. A movement to the right (or left) and in the second direction ($D_2$) up (or down) may result in a multiple-line selection. In this way, the user can highlight and select text using the space bar 108 without taking fingers off the other keys (e.g., keys 128).

In a similar fashion, other gesture commands may be invoked using the space bar 108. By way of example and not limitation, other gesture commands may include spelling check, spelling correction, word replacement, scrolling, page indexing, or other word-processing commands or functions. Other types of commands may also be invoked including, for example, media selection and control, volume control, display brightness control, keyboard brightness control, and/or other device commands or functions.

In implementations, the device is configured to determine if a touch is a keypress or gesture input. Recognition of one or more of touch characteristics of the touch can be used to assist with this termination. In some cases, a touch characteristic or any combination of touch characteristics discussed herein can be used to invoke or initiate a touchpad-type input in response to a force-touch input performed on contact surface 126 of space bar 108. As non-limiting examples, touch characteristics can include: a displacement distance of space bar 108; a force applied to space bar 108; a location of a touch on space bar 108; a motion of a finger 124A, 124B or other object on the surface 126; a travel distance of a finger 124A, 124B or other object on the surface 126; a duration of a touch of a finger 124A, 12B, and so on. A touch characteristic may also be related to other input being provided to the device. For example, a touch characteristic may relate to or be based on a duration or predetermined amount of time since a previous keystroke was received by the one of the keys 106 or the space bar 108. The list of touch characteristics discussed herein is understood to be an example, and is not considered to be limiting or exhaustive. Touch characteristics are determined and/or detected by sensors positioned on or below space bar 108 and/or processing unit(s) of electronic device 100 in electrical communication with the sensors of space bar 108, as discussed below in detail.

In some embodiments, one or more touch characteristics may be analyzed or otherwise used to determine how input to the space bar 108 is treated. For example, one or more characteristics or contexts associated with a touch may be used to determine if the input is treated as a standard key input (e.g., a keypress) or as a touch-based and/or force-based input. In one example, a touch having an applied force sufficient to collapse the dome switch of the space bar 108 may be treated as a keypress resulting in a keystroke command. A force that does not collapse the dome switch may be treated as a force-based input, which may result in a touchpad press command or other similar command. As another example, an applied force that exceeds an actuation threshold (e.g., threshold at which the dome switch collapses) by at least a minimum amount may be treated as a force-based input.

In some cases, in accordance with a determination that a force-touch input is a keypress, the device may suppress or ignore touch input received from the touch sensor. Similarly, in accordance with a determination that a force-touch input is a touch-based or force-based input (e.g., a gesture input), the device may suppress or ignore an actuation of the space bar (e.g., actuation of the space bar collapsible dome or switch). As yet another example, motion of a finger 124A, 124B (or other object) that is less than a threshold distance may be ignored or suppressed by the electronic device 100. In certain embodiments, the threshold distance can be approximately 5 mm. A force-touch input may be detected when the travel distance of user's finger(s) 124A, 124B on or over contact surface 126 of space bar 108 exceeds the predetermined distance and is otherwise ignored.

Space bar 108 of electronic device 100 may also receive multi-force-touch input from one or more finger(s) 124A, 124B. That is, a force-touch input received, provided and/or performed on contact surface 126 of space bar 108 may be performed using a single finger 124A, 124B of the user, or can be performed using multiple fingers. Touch characteristics may be used to determine a multi-force-touch input, similar to the foregoing discussion.

Additionally, detecting a multi-force-touch input performed on space bar 108 may include identifying at least two distinct force-touch inputs performed on contact surface 126 of space bar 108 using both fingers 124A, 124B, and subsequently determining if each force-touch input performed on space bar 108 is moving or is stationary. Where a force-touch input of a multi-force-touch input is determined to be moving, the direction and/or the travel distance of the moving force-touch input on and/or over contact surface 126 of space bar 108 may be determined. As discussed herein, space bar 108 (or other input mechanism or surface) may provide a different signal to electronic device 100 than is provided for a force-touch input using only a single finger 124A, 124B. Depending on the specific force-touch input performed on contact surface 126 of space bar 108, a unique input signal is provided to electronic device 100. As one non-limiting example, different input signals may be provided for force inputs, static touch inputs, gestural touch inputs, key inputs (e.g., in response to a collapsed dome switch), and so on.

Figure 2:
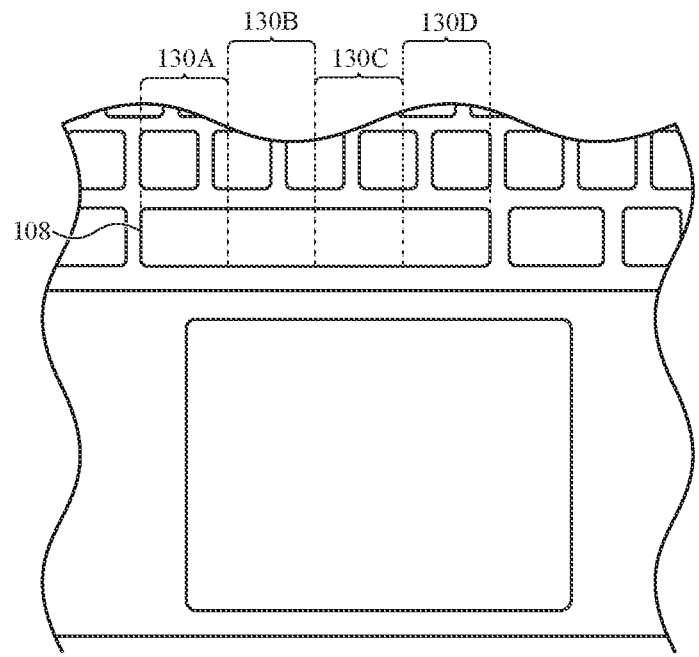
FIGS. 2 and 3 depict an electronic device having a key with more than one touch-sensitive region.

FIG. 2 depicts space bar 108, defining multiple touch-sensitive regions. Specifically, FIG. 2 depicts space bar 108 having four distinct touch-sensitive regions 130A, 130B, 130C, 130D defined along a length of space bar 108. The distinct touch-sensitive regions 130A, 130B, 130C, 130D of space bar 108 shown in FIG. 2 may be indicated to a user by visual indicators, such as varying illumination, and/or tactile indicators, such as physical features like grooves and/or through haptic feedback, although in other embodiments no such indication may be provided. For example, a user may perceive haptic feedback every time his or her finger moves from one touch-sensitive region to another. Although four touch-sensitive regions are shown in FIG. 2, it is understood that any number of touch-sensitive regions can be formed and/or included on space bar 108. Likewise, although referred to as "touch-sensitive regions," the regions may be force-sensitive in addition to, or instead of, sensing touch. Further, the division of the space bar 108 (or any other touch-sensitive surface discussed herein) may be virtual or logistical rather than reflect a physical division of the space bar or attendant sensors into separate regions.

Each touch-sensitive region 130A, 130B, 130C, 130D of space bar 108 shown in FIG. 2 may provide a distinct input to electronic device 100. In some cases, each touch-sensitive region 130A, 130B, 130C, 130D is associated with a different command or function. By way of example, when a force-touch input is provided and/or performed on contact surface 126 of space bar 108 within a first touch-sensitive region 130A, a first input may be provided to the electronic device 100, which may be associated with a first command or function. Additionally, when a force-touch input is provided and/or performed on space bar 108 within a second touch-sensitive region 130B, a second input, distinct from the first input, is provided to electronic device 100. Accordingly, the single space bar 108 may provide multiple, different touch- and/or force-based inputs to the associated electronic device, and the input provided may vary with the part of the space bar 108 on which the touch or force is delivered. Thus, the input mechanism may be segmented to provide different inputs not only based on force or touch, but also on location. Likewise, the same gesture performed in different regions 130A, 130B, 130C, 130D of the space bar 108 may provide different inputs to the electronic device 100.

Additionally, different inputs may be provided if a user interacts with multiple regions of the space bar as part of a single gesture or the like. In a non-limiting example shown in FIG. 2, when user's finger 124A moves in a first direction within first touch-sensitive region 130A of space bar 108, a first input signal associated with first touch-sensitive region 130A is provided to electronic device 100. Additionally in the non-limiting example, when user's finger 124A moves in a first direction from first touch-sensitive region to second touch-sensitive region 130B, a different input signal associated with second touch-sensitive region 130B is provided to electronic device 100.

It should be appreciated that each touch-sensitive region 130A, 130B, 130C, 130D of space bar 108 can result in various input signals based on the force-touch input provided therein. Specifically, depending on the force-touch input performed and the associated touch characteristics (e.g., the direction of movement of finger(s) 124A, 124B) of the force-touch input, the resulting input signal provided to electronic device 100 can be unique. Continuing the example above, when user's finger 124A moves in a first direction within first touch-sensitive region 130A of space bar 108, a first input signal associated with first touch-sensitive region 130A is provided to electronic device 100. However, when user's finger 124A moves in a second direction within first touch-sensitive region 130A of space bar 108, a unique or distinct input signal associated with first touch-sensitive region 130A is provided to electronic device 100. The unique or distinct input signal provided to electronic device 100 is unique or different than the first input signal provided to electronic device 100. Likewise, the same gesture in a region (or between regions), but performed with a different exerted force, may result in different inputs to the electronic device 100.

Space bar 108 having touch-sensitive regions 130A, 130B, 130C, 130D is also configured to receive multi-force-touch inputs. That is, and as similarly discussed herein with respect to FIG. 1B, space bar 108 having touch-sensitive regions 130A, 130B, 130C, 130D can receive and/or detect multi-force-touch inputs from more than one finger 124A, 124B of a user or from more than one object.

Figure 3:
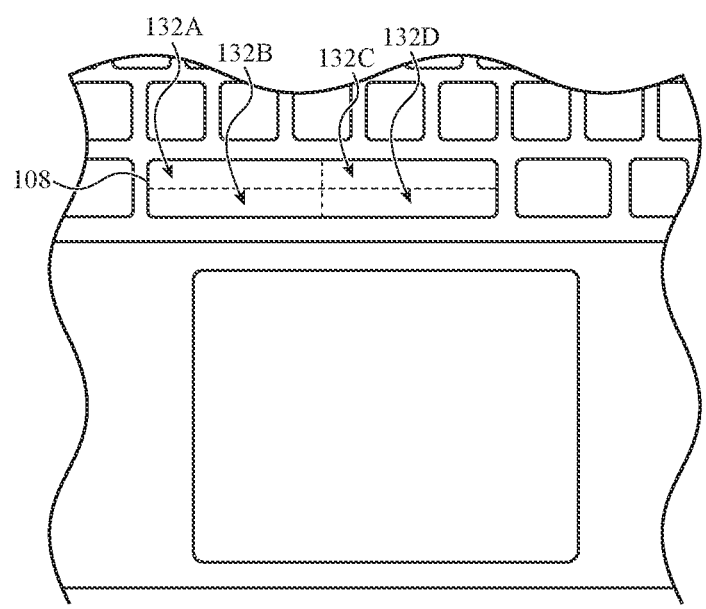

FIG. 3 depicts another non-limiting example of space bar 108 including four distinct touch-sensitive regions 132A, 132B, 132C, 132D. As shown in FIG. 3, touch-sensitive regions 132A, 132B, 132C, 132D occupy and/or are positioned in distinct quadrant reguibs of space bar 108. Touch-sensitive regions 132A, 132B, 132C, 132D of space bar 108 shown in FIG. 3 function substantially similar to touch-sensitive regions 130A, 130B, 130C, 130D discussed herein with respect to FIG. 2. Redundant explanation of these components has been omitted for clarity.

Figure 4:
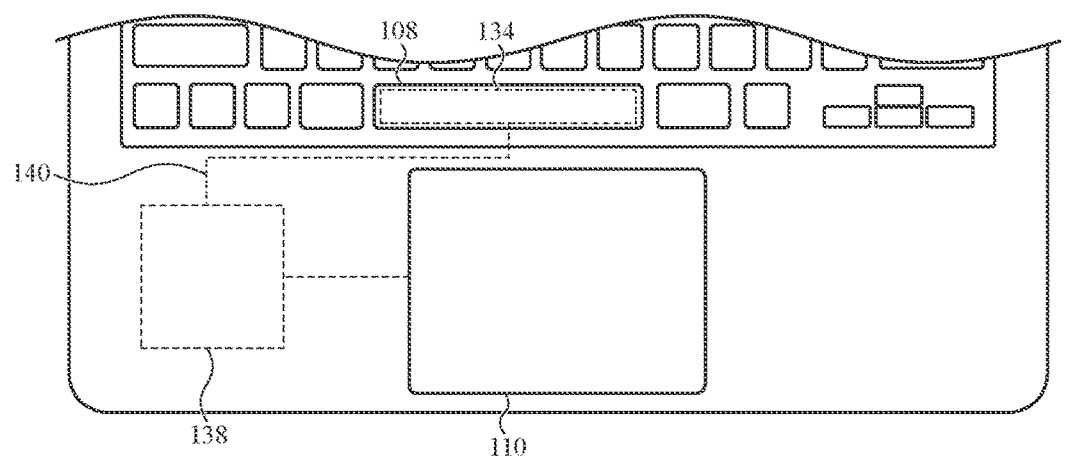
FIG. 4 depicts an electronic device including a space bar, a touchpad, a processing unit and a capacitive touch sensor integrated into the space bar.

FIG. 4 illustrates a portion of a sample electronic device 100, including a space bar 108 and touch-sensitive input surface or touchpad 110. As previously discussed, both the space bar 108 and touchpad 110 may be configured to accept force-touch input from the user. As also previously discussed, space bar 108 may be configured to provide functionality typically provided by the touchpad 110. As one example, a touch-sensitive key cap (or other surface) of space bar 108 may be configured to recognize or detect force-touch inputs used to provide cursor control, gesture commands, and/or touchpad press commands, as well as keypress input that may be used to provide keystroke commands.

For example and as illustrated in FIG. 4, a sensor array 134 may be integrated into or beneath space bar 108. The sensor array 134 may include a touch and/or force sensor in accordance with some embodiments. A touch sensor may include an array of capacitive electrodes that are configured to detect the presence of an object using self-capacitance or mutual-capacitance sensing schemes. A force sensor may include one or more pressure-sensitive or force-sensitive elements that are configured to produce a non-binary output that corresponds to a magnitude of a force applied to the space bar 108. The force sensor may include a strain sensor, capacitive-gap sensor, transducer, or other pressure-sensitive or force-sensitive element(s).

The sensor array 134 may be formed from one or more individual sensors, of any size. It should be appreciated that sensitivity of the touch and/or force sensor of the sensor array 134 may vary with the number, density, and/or position of sensors within, affixed to, beneath, or otherwise associated with the space bar 108. For example, in embodiments where the space bar 108 is sensitive only to gestural inputs along a particular axis (for example, left-right or top-bottom), the sensor array 134 may include a touch and/or force sensor having a linear arrangement and configured to detect changes in location or force along the length of the space bar 108. Alternatively, if the space bar 108 is configured to receive multi-dimensional gestures, the touch and/or force sensor may have a multi-dimensional (e.g., 2-dimensional) arrangement and may be configured to detect changes in location or force along both the length and the width of the space bar 108.

In embodiments employing one or more capacitive sensors to detect touch and/or force as inputs on or to the space bar 108, either mutual-capacitance or self-capacitance sensors may be used. The electrodes of the sensor array may be formed into or positioned along a feature of the space bar 108. In some embodiments, a capacitive plate sensor scheme may be used. For example, a first plate, electrode, or the like of a sensor may be affixed to a bottom surface of a key cap and a second plate, electrode, or the like of the sensor may be affixed to, incorporated in, or placed within a base of the electronic device (or otherwise beneath the key cap). A touch and/or force exerted on the key will move the key cap downward, at least slightly, thus moving the first electrode closer to the second electrode. This results in a change in capacitance between the first and second electrodes; the change in capacitance may be equated to a touch, as well as a location of a touch in embodiments having an array of sensors. Further, in some embodiments, the amount of a change in capacitance may be equated or otherwise used to determine or estimate a force applied to the key cap. Other sensing schemes may include optical sensors, strain-based sensors, or other sensors configured to detect movement of the space bar 108.

Figure 5:
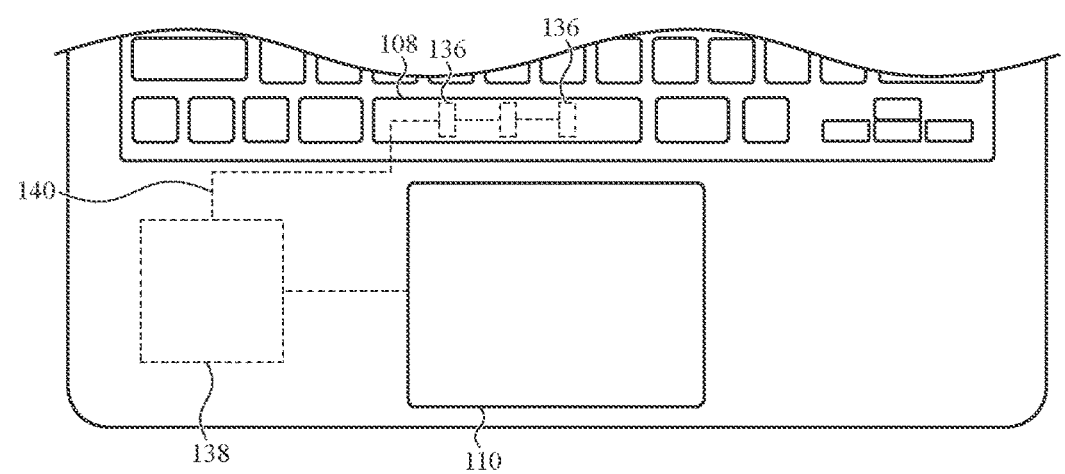
FIG. 5 depicts an electronic device including a space bar, a touchpad, and a group of optical sensors positioned below a contact surface of the space bar.

FIG. 5 depicts an alternative sensor arrangement for a touch and/or force sensor arranged along the length of the space bar 108. In the present example, the optical sensing array 136, formed of multiple optical sensors, may be used to determine a touch event, a location of a touch, and/or an exerted force on a surface (e.g., key cap) of a space bar 108. A transmitter of the optical sensing array 136 may emit a light that may reflect off the space bar 108 and be received by a detector. As the space bar 108 is pressed, a (lower) surface of the space bar 108 moves toward the optical sensing array 136. In some cases, a location on the detector at which the reflected light is received changes as the space bar is pressed. Thus, given the location on the detector (or which detector, in a group) receives the light, the embodiment may determine a distance the space bar has traveled and equate that to an exerted force.

Further, given an array of optical sensors having multiple transmitters and multiple detectors, a location of a touch may be determined. A force exerted on the space bar (or any suitably configured key) may locally deflect part of the space bar more than a remainder of the space bar. This localized deflection may be optically sensed and equated to a touch location. As another option, an exerted force may cause the space bar 108 (or other key) to twist, angularly deflect, or otherwise move unevenly downward. The relative locations of light received by various detectors of the optical sensing array 136 may detect such uneven motion; the location of a touch may accordingly be estimated.

As another option, optical sensing array 136 positioned below and/or on space bar 108 may provide light to, through and/or around space bar 108 and detect a change in light when finger(s) 124A, 124B contact and/or move on or over space bar 108. The detection in the change in light results in the detection of the force-touch input performed on space bar 108.

In some embodiments, the sensing arrays 134, 136 may be configured to sense a touch (and/or location thereof), a force (and/or a location thereof), or both a location and a force. Further, in some embodiments, one sensor or array may be used to determine a touch event and/or location, while another sensor or array may be used to determine a force event and/or location.

It should be appreciated that keys other than the space bar 108 may incorporate a sensor 134, 136 or sensing array. Further, although embodiments herein are discussed with respect to a space bar 108 and touchpad 110 (or touch-sensitive surface) located adjacent or near the space bar 108, it should be appreciated that any key (or group of keys) and a touch-sensitive surface at any suitable location may implement structures, apparatuses, techniques, methods, and the like described herein. Accordingly, the discussion of a space bar and touchpad or other touch-sensitive surface is meant as an example and not a limitation, and the discussion herein applies equally to other keys and other touch-sensitive surfaces, including those located elsewhere on or in an electronic device.

Although discussed herein as a capacitive sensor array 134 and optical sensing array 136, it is understood that the sensor(s) positioned below and/or on space bar 108 can be any suitable sensor or sensory system configured to detect force-touch input performed on space bar 108. In another non-limiting example, at least one acoustic sensor can be positioned within enclosure 102 and/or on space bar 108. The acoustic sensor(s) can detect force-touch input when the acoustic wave(s) propagating through enclosure 102 and/or space bar 108 is altered by user's finger(s) 124A, 124B contacting space bar 108 to perform the force-touch input.

As previously mentioned, a dome switch or other suitable switch may be associated with the space bar 108. When the space bar (or any other suitable key) is depressed a sufficient distance, it may collapse the dome switch and thereby generate a first electrical input signal. By contrast, a touch on the space bar surface may be sensed by the appropriate sensor and a second electrical input signal may be generated. A force exerted on the space bar 108 may result in a sensor generating a third electrical input signal corresponding to the amount of exerted force; the sensor generating the second input signal may also generate the third input signal in certain embodiments, or different sensors may be used. Further, the third input signal and second input signal may differ only in magnitude or another electrical characteristic, e.g., the third input signal may be the second input signal with a different amplitude, frequency, or the like. In some embodiments, the second and/or third input signal may be generated even if the first input signal is not; thus, a touch and/or force on a space bar 108 (or other key) may be detected and used as input even if that force is insufficient to actuate the associated switch. Thus, a single key may generate multiple different types of inputs, each associated with a different input provided by the user.

FIGS. 4 and 5 also show an optional processing unit 138, shown in phantom, included in electronic device 100. Processing unit 138 is electrically coupled to and/or in electrical communication with the at least one sensor (e.g., capacitive sensor array 134, optical sensing array 136) positioned below and/or on space bar 108 using electrical conduit 140 (e.g., electrical wire). The processing unit 138 may also be operatively coupled to the switches (e.g., compressible domes) of the keyboard including the space bar 108. The processing unit 138 of electronic device 100 is configured to aid in the determination of a force-touch input and may process signals relating to certain touch and/or force characteristics of the force-touch input performed on space bar 108.

In some embodiments, processing unit 138 may be used if space bar 108 lacks a switch to produce a key-press-related input. For example, when space bar 108, and specifically the sensors (e.g., capacitive sensor array 134, optical sensors 136) positioned below and/or on space bar 108, detect a force-touch input, processing unit 138 receives the touch and/or force characteristics from the sensors of space bar 108 and may determine if a force-touch input was performed on space bar 108, or if a keypress input was performed. The algorithm or logic used by the processing unit 138 may be in accordance with other embodiments and examples provided herein for determining a type of input based on a touch and/or force characteristic. When a force-touch input is determined to have been performed on space bar 108, processing unit 138 may initiate appropriate action. In some cases, the processing unit 138 may ignore or suppress other input in accordance with the determination.

As shown in FIGS. 4 and 5, processing unit 138 optionally is also in electrical communication with touchpad 110. Processing unit 138 is also configured to process force-touch inputs performed on touchpad 110 of electronic device 100, as discussed herein. Specifically, processing unit 138 is in electrical communication with the sensors of touchpad 110 (not shown) which detect the force-touch inputs provided to touchpad 110 in a similar manner as the sensors of space bar 108 discussed herein with respect to FIGS. 4 and 5. When a force-touch input is performed on touchpad 110, the touch characteristics are received by processing unit 138, and the type of force-touch input may be determined, and a corresponding input signal is provided to electronic device 100 from processing unit 138. Processing unit 138 is any suitable processing unit or microcontroller that is configured to perform operations in response to computer-readable instructions and inputs, including force-touch input.

Figure 6A:
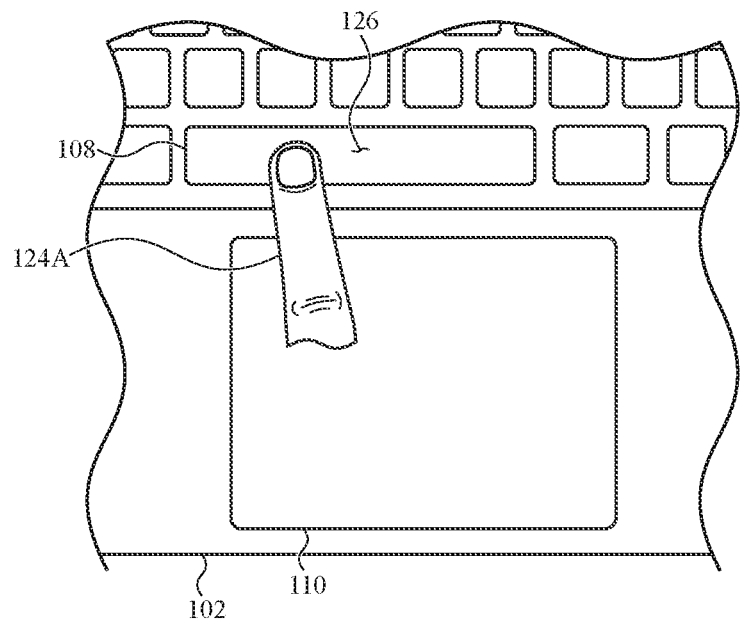
FIG. 6A depicts an electronic device including a multi-input device, and a user interacting with the multi-input device.
Figure 6B:
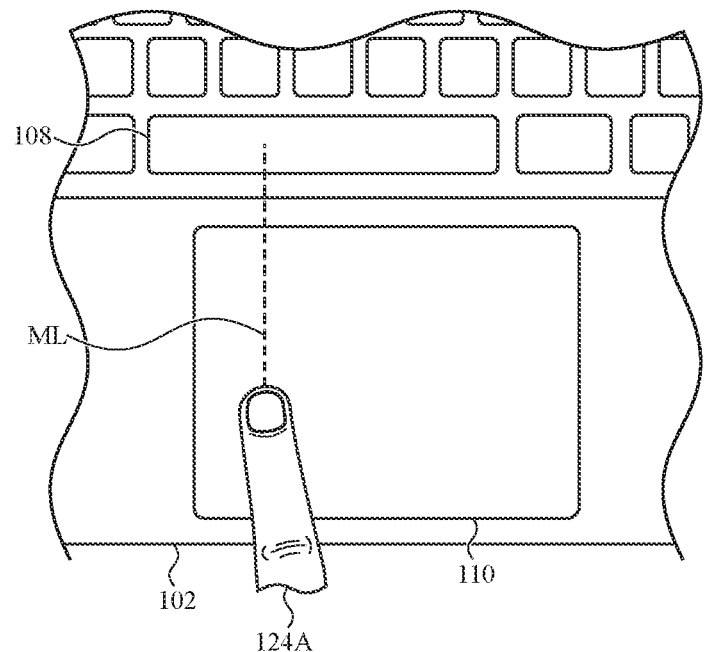
FIG. 6B depicts the electronic device shown in FIG. 6A, indicating a user input that spans multiple input devices.

FIGS. 6A and 6B illustrate how the space bar 108 and the touchpad 110 may be used as a combined touch-sensitive region. In particular, touch input may be initiated on either the space bar 108 or the touchpad 110 and extend into the area defined by the other device. The output received by both the space bar 108 and the touchpad 110 may be combined to provide a single touch-based and/or force-based command or function. In one illustrative example, finger 124A moves from a first position on space bar 108 (see, FIG. 6A) along a motion line (ML) to a second position on touchpad 110 (see, FIG. 6B). The touch characteristics (e.g., force, displacement of space bar 108, travel direction and so on) of finger 124A as it moves along motion line (ML) are similar to a force-touch input that can be performed on space bar 108 and/or touchpad 110, as discussed herein. However, as shown in FIGS. 6A and 6B, the travel distance of finger 124A as it performs the force-touch input is greater than the size of space bar 108, and finger 124A contacts touchpad 110 after contact with space bar 108 ends.

In a non-limiting example, processing unit 138 is in electrical communication with sensors of both space bar 108 and touchpad 110. The processing unit 138 may receive first input signal(s) from the space bar 108, indicating an initial touch and/or force exerted on the space bar 108. As the finger 124A moves from the space bar 108 to the touchpad 110, the processing unit 138 may receive second input signal(s) from the touchpad 110, corresponding to the continuation of the finger's 124A motion. The processing unit 138 may employ both first and second signals as part of, or indicating, a common gestural input. In this manner, the user may provide a single input that spans at least a portion of both the space bar 108 and touchpad 110. Further, various touch characteristics may affect one or both of the first and second signals; these touch characteristics may therefore be used as input to the processing unit 138. The touch characteristics analyzed by processing unit 138 can include, but are not limited to, a time between finger 124A ending contact with space bar 108 and beginning contact with touchpad 110, and detected contact location or path for finger 124A on both space bar 108 and touchpad 110. As one example, when a time of non-contact of space bar 108 and touchpad 110 for finger 124A is below a non-contact threshold and/or when the contact location or path of finger 124A is substantially aligned from space bar 108 to touchpad 110, processing unit 138 determines that the force-touch input provided to space bar 108 then touchpad 110 is a single force-touch input.

Continuing this non-limiting example, a non-contact threshold is approximately 0.5 seconds, 1.0 seconds, or the like. In the non-limiting example, the non-contact time for finger 124A as it moves along motion line (ML) from space bar 108 to touchpad 110 is approximately 0.3 seconds, which is less than the non-contact threshold. As a result, processing unit 138 determines that the force-touch input performed by finger 124A on space bar 108 and touchpad 110 is a continuous, single force-touch input, and will provide an output or otherwise process accordingly.

Processing unit 138 can also determine that the force-touch input provided by finger 124A is a single force-touch input by analyzing the contact location or contact path of finger 124A as finger 124A contacts space bar 108 and touchpad 110. In another non-limiting example and still with reference to FIGS. 6A and 6B, finger 124A moves along motion line (ML) from space bar 108 to touchpad 110. Sensors of space bar 108 and touchpad 110 can detect and/or determine that the contact location or path of finger 124A on space bar 108 is aligned with the contact location or path of finger 124A on touchpad 110. Additionally the travel of finger 124A may be consistent and/or identical as finger 124A moves from space bar 108 to touchpad 110 along motion line (ML). As a result, processing unit 138 may determine that the force-touch input performed by finger 124A, as shown in FIGS. 6A and 6B, is a continuous, single force-touch input, and may treat the multiple input signals from space bar 108 and touchpad 110 as part of a single input.

While the example of FIGS. 6A and 6B depict a finger 124a moving from the space bar 108 to the touchpad 110, a similar technique may be used for touch input having a first portion that is initiated within an area of the touchpad 110 and having a second portion that extends into an area of the space bar 108. The touch input may be completed within the area of the space bar 108 or the area of the touchpad 110. The first and second portions of the touch input may be treated as a single touch input and used to initiate or invoke a touch-based command including, for example, cursor control, a gesture command, or other touch-based commands.

Figure 7:
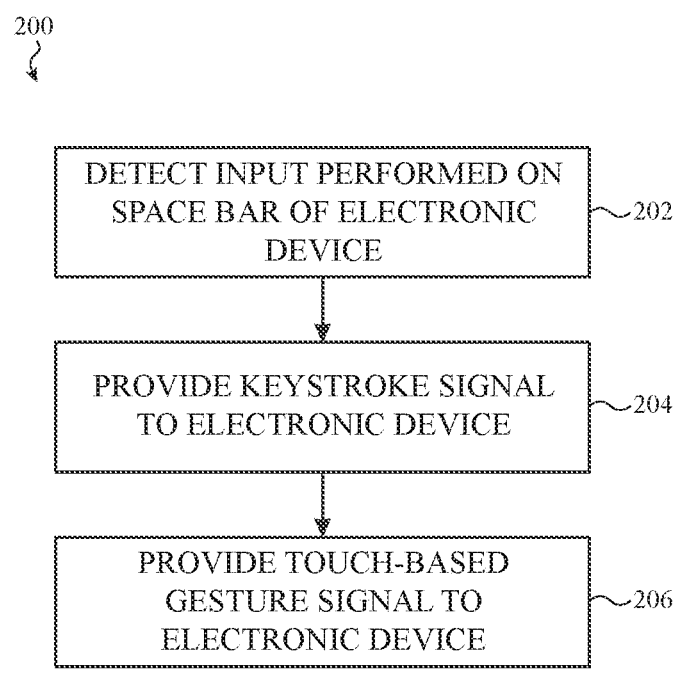
FIG. 7 depicts a flow chart of an example process for providing various signals to an electronic device using a space bar.

FIG. 7 depicts an example process for providing distinct signals to an electronic device. Specifically, FIG. 7 is a flowchart depicting one example process 200 for providing distinct electrical signals for interacting with an electronic device using a space bar. In some cases, the space bar may be utilized in an electronic device, as discussed below with respect to FIGS. 1A-6B.

In operation 202, an input performed on a space bar of an electronic device is detected. The input performed on the space bar of the electronic device includes a keypress input or a touch-based gesture input (hereafter, "force-touch input"). The keypress input is performed by displacing the space bar, and the force-touch input is performed on a contact surface of the space bar. Either or both of the keypress input and the force-touch input are provided and/or performed on the space bar by a user's finger(s) and/or a distinct object or component configured to contact the contact surface of the space bar for providing the distinct inputs.

Detecting the keypress input can include determining if the space bar is displaced a predetermined distance and/or determining if a force applied to the space bar exceeds a predetermined force threshold. As another option, detecting a keypress input may correspond to a switch closing as a result of the input on the space bar; for example, a user may exert sufficient force on the space bar to collapse a dome switch beneath the space bar, thereby generating a keystroke command or signal corresponding to the keypress input.

Detecting the force-touch input can include sensing the force-touch input on the contact surface of the space bar. The force-touch input provided and/or performed on the contact surface of the space bar are force-touch inputs or gestures performed by a user's finger(s) that are typically performed on and/or associated with inputs or gestures performed on a touchpad of the electronic device. Detecting the force-touch input can also include determining if a travel distance of the force-touch input exceeds a threshold distance; the threshold distance may be set to reject inadvertent motions of an object on the key. Detection of a force-touch input may also employ other touch and/or force characteristics.

For example, detecting the force-touch input can also include determining if the space bar is displaced a predetermined distance and/or determining if the force applied to the space bar exceeds a predetermined force threshold, as similarly discussed above. When it is determined that the space bar is not displaced the predetermined distance and/or the force applied to the space bar does not exceed the predetermined force threshold, no force-touch input is detected on the space bar.

In operation 204, a keystroke command or signal is provided to the electronic device if the keypress input is detected. The keystroke command or signal may correspond to an input generated by a conventional key of a conventional keyboard, for example.

In operation 206, a force-touch input signal is provided to the electronic device, if the force-touch input was detected in operation 202. As discussed, the input signal is dependent on the specific force-touch input and associated touch characteristics (e.g., direction, travel distance, and so on) performed on the contact surface of the space bar.

Accordingly, the single space bar 108 (or other suitably configured key) may provide both a standard keypress input and a force-touch input, and one or both signals may be used as input for an electronic device.

Figure 8A:
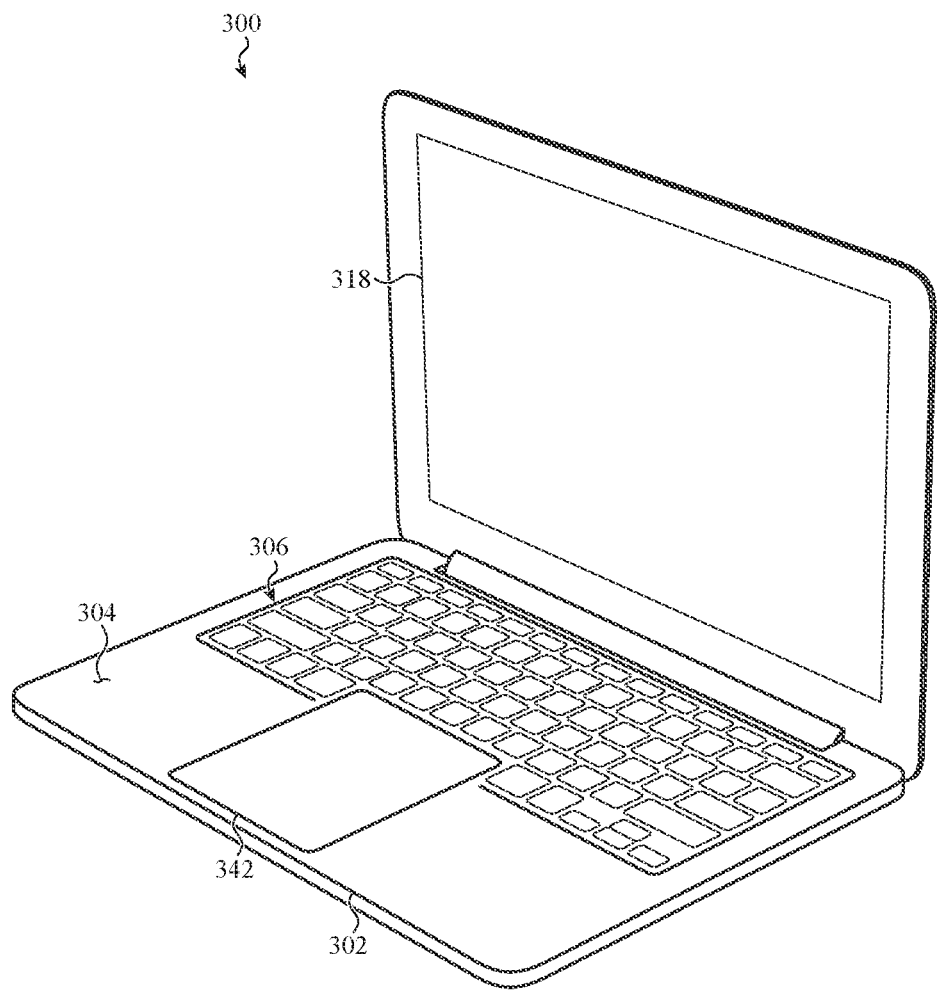
FIG. 8A depicts an electronic device, including another sample multi-input device.
Figure 8B:
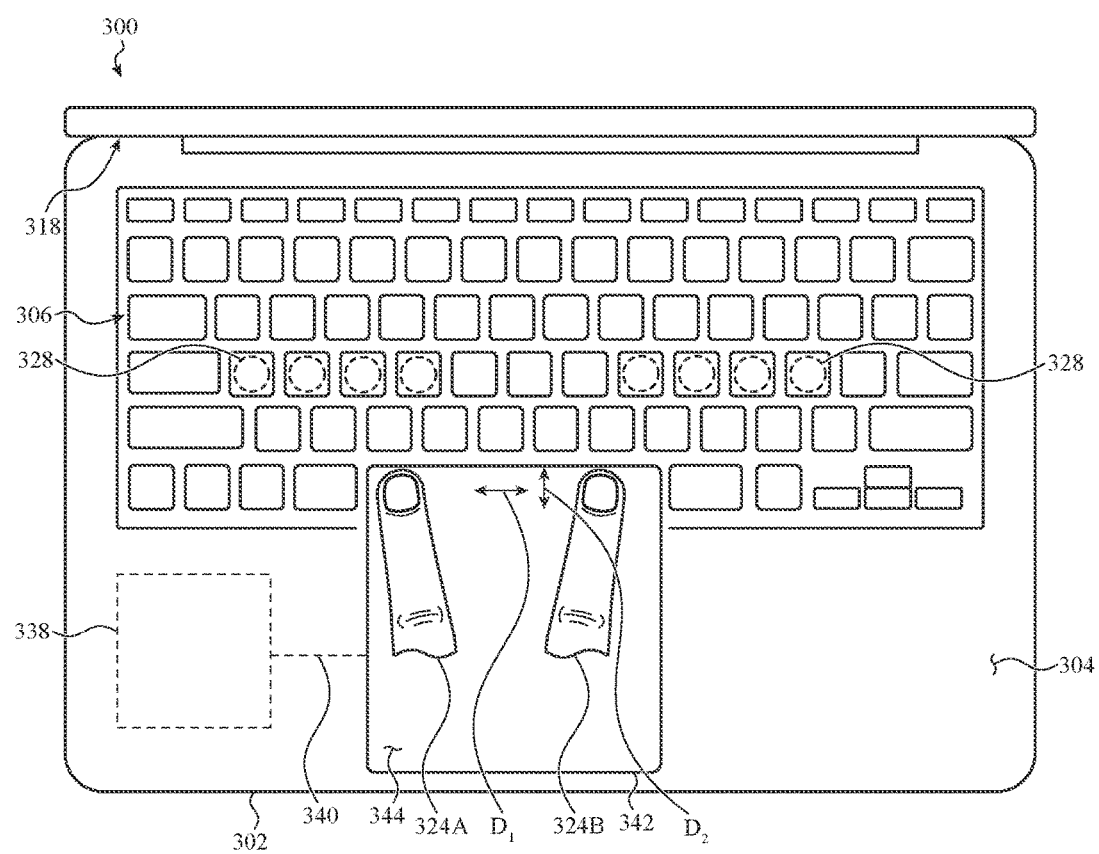
FIG. 8B depicts the electronic device of FIG. 8A, with a user providing gestural input to the multi-input device.

FIGS. 8A and 8B show another non-limiting example of electronic device 300. Electronic device 300 is a notebook or laptop computer or computing system substantially similar to electronic device 100 shown and discussed herein with respect to FIGS. 1A and 1B. As such, electronic device 300 includes substantially similar components and/or features as electronic device 100. For example, as shown in FIGS. 8A and 8B, electronic device 300 includes a set of keys 306 exposed on top surface 304 of enclosure 302 and a touchpad 342 (example touch-sensitive surface). Redundant explanation of these components has been omitted for clarity.

In the examples of FIGS. 8A and 8B, the set of keys 306 is positioned at least partially within the enclosure 302 and defines a keyboard region. The touch-sensitive input surface 342 may function as both the touchpad and the space bar of the device 300. In one example, the touch-sensitive input surface 342 defines a first touch-sensitive surface or region that is located within the keyboard region defined by the set of keys 306. The touch-sensitive input surface 342 may also define a second touch-sensitive surface or region that extends beyond the keyboard region. Both the first and second touch-sensitive surfaces may be configured to detect a location of a touch and a magnitude of a force of the touch. This may be accomplished using a touch sensor, force sensor, and/or other techniques described with respect to various embodiments.

Also similar to electronic device 100 as discussed above, electronic device 300 includes an input component configured to receive and/or recognize both keypress inputs and force-touch inputs. However, unlike the example shown in FIG. 1A, the input component capable of generating both keystroke commands and the touch- or force-based commands is a touchpad 342 (for example, a touchpad). As shown in FIGS. 8A and 8B, touchpad 342 is positioned adjacent the set of keys 306 and is exposed through top surface 304 of enclosure 302. The set of keys 306 of electronic device 300 forms a QWERTY keyboard, excluding a space bar. In a non-limiting example shown in FIGS. 8A and 8B, where set of keys 306 excludes a space bar, a portion of touchpad 342 is positioned adjacent the set of keys 306, replaces the space bar, and/or is at least partly encompassed by a portion of the set of keys 306. That is, a portion of touchpad 342 extends into the set of keys 306 and is positioned in a space or portion of electronic device 300 that is typically occupied by a space bar.

Similar to space bar 108 discussed herein with respect to FIGS. 1A-6B, touchpad 342 of electronic device 300 is configured to receive various types of inputs. The various types of inputs include keypress inputs and force-touch inputs performed on touchpad 342 by a user of electronic device 300.

Touchpad 342 of electronic device 300 can be deflected and/or can receive a force when a keypress input is performed on and/or provided to touchpad 342. In a non-limiting example, the keypress input is performed when at least one user finger 324A, 324B (see, FIG. 8B) applies a force to contact surface 344 of touchpad 342. The force applied to touchpad 342 by user's finger(s) 324A, 324B is received and/or detected by touchpad 342, and in some embodiments, deflects at least a portion of touchpad 342 that receives the applied force. As discussed below and as discussed herein with respect to space bar 108, an input may be processed as a keypress input if the force of the input exceeds a threshold, the velocity of the input exceeds a threshold, the duration of the input is beneath a threshold, or some combination of the three. (These same criteria may be used to differentiate a keypress input from a force-touch input or an inadvertent input in any embodiment herein, including the force- and touch-sensitive space bar 108 discussed above.) It should be appreciated that these are example criteria, and other criteria, including other touch and/or force characteristics, may be used to differentiate a keypress input from a force-touch input.

When a keypress input is performed on touchpad 342, a keystroke command or signal is provided to electronic device 300. The keystroke command or signal provided to electronic device 300 can be associated with, mimic, or otherwise correspond to a typical space bar-input provided to electronic device 300.

Touchpad 342 of electronic device 300 can also receive force-touch inputs for providing input signals to electronic device 300 and output corresponding input signals. For example, force-touch inputs are performed on a contact surface 344 of touchpad 342, and consequently, an input signal is provided to electronic device 300 when a force-touch input is determined and/or detected. In a non-limiting example, the user's finger(s) can contact, touch and/or move on or over contact surface 344 of touchpad 342 to perform a force-touch input on touchpad 342 in a manner similar to those previously described.

Similar to space bar 108 discussed herein with respect to FIGS. 1B-6B, when a force-touch input is detected or performed on touchpad 342, an input signal is provided to electronic device 300. The input signals provided to electronic device 300 are based on the force-touch input performed on contact surface 344 of touchpad 342. As one example, a unique input may be dependent on the touch characteristics for the force-touch input performed on contact surface 344 of touchpad 342, and generated accordingly.

As similarly discussed herein with respect to FIGS. 4 and 5, electronic device 300 includes processing unit 338 in electrical communication with touchpad 342 via electrical conduit 340. The processing 338 unit may perform any function previously described with respect to space bar 108 and/or its inputs, for touchpad 342 and/or its inputs. Inputs may be identified and processed as discussed above with respect to the space bar 108.

In some embodiments, the touchpad 342 may lack an associated switch that generates a keystroke command or signal when closed. Thus, the touch characteristics relating to and/or associated with the input performed on touchpad 342 are used and analyzed to determine the type of input performed on touchpad 342. A variety of touch characteristics obtained in relation to the input performed on touchpad 342 can be analyzed by processing unit 338 to determine if the input is a keypress input or a force-touch input.

In a non-limiting example, touch characteristics can include the force applied to touchpad 342. The force applied to touchpad 342 can be compared to a predetermined force threshold to determine if the force applied to touchpad 342 exceeds the predetermined force threshold. If the applied force exceeds an actuation threshold, an associated input may be treated as a keypress. As another option, an input force may be required to exceed a force threshold and the input may be required to be present for less time than a temporal threshold, for the corresponding input to be treated as, or equated to, a keypress. In some cases, the threshold may be programmable or controlled to provide an increased or decreased actuation threshold. These are illustrative examples of touch and/or force characteristics that may be used to differentiate a keypress input from a touch-force input. These techniques may be combined with other characteristics to determine the type of input received.

In another non-limiting example, touch characteristics can include a travel distance of the input performed on touchpad 342. The travel distance of the input performed on touchpad 342 can be compared to a threshold distance to determine if the travel distance of the input exceeds the threshold distance. As previously discussed herein with respect to FIG. 1B, the threshold distance is a distance equal to an average movement distance of user's finger(s) 324A, 324B (or distinct component or object) on or over touchpad 342 when the keypress input is performed on touchpad 342. As such, if processing unit 338 determines the travel distance of the input performed on touchpad 342 exceeds the threshold distance, processing unit 338 will determine the input performed on touchpad 342 is a force-touch input, and will subsequently provide a input signal to electronic device 300, as discussed herein.

A direction of travel of the input across and/or on contact surface 344 can also be analyzed (for example, by processing unit 338) to determine the type of input performed on touchpad 342. In a non-limiting example, processing unit 338 can obtain touch characteristics relating to the travel direction of the input performed on touchpad 342. Such data may be used to control a cursor or other graphical object on an associated display, as one example.

In a non-limiting example where two or more consecutive inputs are performed on touchpad 342, touch characteristics can include a detected number of inputs performed on touchpad 342 over a predetermined period of time. In the non-limiting example, processing unit 338 can determine the type of input performed on touchpad 342 by comparing the detected number of inputs performed on touchpad 342 over the predetermined period of time to a predetermined consecutive input threshold. The predetermined consecutive input threshold relates to an average number of multiple keypress inputs that are typically performed over a predetermined period of time on a space bar for an electronic device. As such, when the detected number of inputs performed on touchpad 342 over the predetermined period of time equal or exceeds the predetermined consecutive input threshold, processing unit 338 determines a keypress input is performed on touchpad 342.

Processing unit 338 can also determine the type of input performed on touchpad 342 by obtaining and/or analyzing information relating to electronic device 300. Thus, for example, certain programs, user settings, software, and the like may vary thresholds and/or other criteria for assigning an input as either a keypress or a force-touch input.

As similarly discussed herein with respect to FIG. 1B, one or more of the touch characteristics can be used to detect a type of input performed on touchpad 342. That is, a single touch characteristic or any combination of touch characteristics discussed herein can be used to detect and/or determine the type of input performed on contact surface 344 of touchpad 342. Additionally, the list of touch characteristics discussed herein is understood to be an example, and is not considered to be limiting or exhaustive.

Similar to space bar 108 discussed herein with respect to FIGS. 1A and 1B, utilizing touchpad 342 configured to receive various inputs (e.g., keypress, touch, force, and/or a combination thereof), and subsequently provide distinct, corresponding signals to electronic device 300, a user is not required to remove their fingers 324A, 324B, 328 from the set of keys 306 of keyboard and touchpad 342 to perform space bar-inputs or touch gestures. That is, rather than removing at least a portion of fingers 324A, 324B, 328 from the set of keys 306 to perform touch gestures on touchpad 342 of electronic device 300, a user may keep his or her fingers 324A, 324B positioned on and/or over the set of keys 306 of electronic device 300 and provide or perform keypress inputs and force-touch inputs on touchpad 342. This allows for seamless and improved interaction with electronic device 300 because a user does not have to reposition their fingers 324A, 324B each time they want to transition between typing and performing a force-touch input on electronic device 300.

Figure 9:
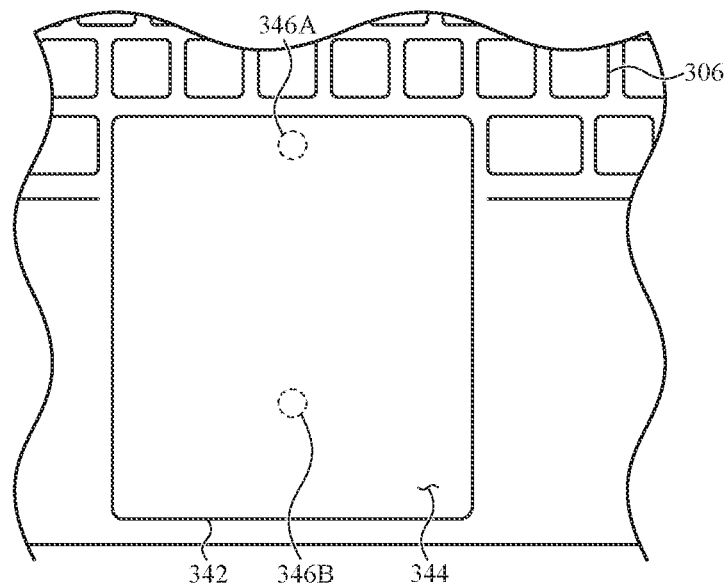
FIG. 9 depicts a portion of an electronic device including a sample multi-input device, and particularly displaying locations of two force-touch inputs thereon.

As shown in FIG. 9, the various types of inputs can be performed anywhere on contact surface 344 of touchpad 342. Specifically, the keypress input and the force-touch input can be performed on any portion of contact surface 344 of touchpad 342, and processing unit 338 (see, FIG. 8B) can determine and/or detect the type of input performed on touchpad 342 using the touch characteristics discussed above with respect to FIG. 8B. In non-limiting examples shown in FIG. 9, keypress input and/or force-touch input can be performed on touchpad 342 in a first location 346A substantially adjacent the set of keys 306 of electronic device 300 (see, FIG. 8B) or keypress input and/or force-touch input can be performed in a second location 346B opposite first location 346A. Although two specific locations are identified on touchpad 342, it is understood that each input (e.g., keypress input, force-touch input) can be performed on any portion of touchpad 342 and be determined and/or detected by processing unit 338 of electronic device 300.

Figure 10:
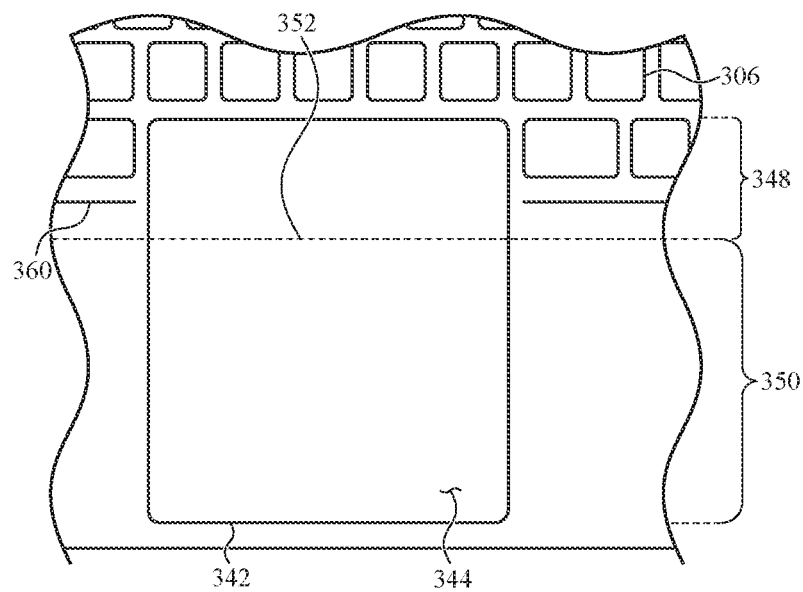
FIG. 10 depicts the electronic device of FIG. 9, illustrating multiple input regions defined on a surface of the multi-input device.

FIG. 10 depicts touchpad 342 defining distinct regions. Specifically, FIG. 10 depicts touchpad 342 having a first region 348 corresponding to a first touch-sensitive surface and a second region 350 corresponding to a second touch-sensitive surface. First region 348 of touchpad 342 is positioned adjacent the set of keys 306 of electronic device 300 (see, FIG. 8B). In some embodiments, the first region 348 (corresponding to the first touch-sensitive surface) is within a keyboard region 360 defined by the set of keys 306 or keyboard. As shown in FIG. 10, the first region 348 is partially surrounded by a portion of the set of keys 306 and is positioned in a space on top surface 304 of electronic device 300 that is typically occupied by a space bar, as discussed herein.

Second region 350 of touchpad 342 is positioned adjacent first region 348 and opposite the set of keys 306 of electronic device 300. The second region 350 (corresponding to a second touch-sensitive surface) extends beyond the keyboard region 360 defined by the set of keys 306 or keyboard. As shown in FIG. 10, first region 348 is positioned between the set of keys 306 and second region 350. Separation line 352 shown in FIG. 10 is shown to distinguish the two regions 348, 350, and/or can be an actual line or visual indicator on touchpad 342 differentiating the two regions 348, 350 of touchpad 342 for a user. That is, the distinct regions 348, 350 of touchpad 342 can be known or learned by a user of electronic device 300, or alternatively, the distinct regions 348, 350 of touchpad 342 can be defined to a user by visual indicators (e.g., paint), and/or tactile indicators (e.g., groove) formed along separation line 352. Although two regions are shown in FIG. 10, it is understood that any number of regions can be formed and/or included on touchpad 342.

Touchpad 342 having first region 348 and second region 350 shown in FIG. 10 can receive, determine and/or detect specific inputs in specific regions. For example, first region 348 and second region 350 can be configured to only generate one type of input signal in response to and performed within the specific region of touchpad 342. For example, an input in first region 348 may always be treated as a keypress, regardless of any characteristics of the input touch and/or force. Likewise, an input in second region 350 may always be treated as a force-touch input.

As another option, one region of touchpad 342 can be limited to outputting a single type of input signal (or inputs in that region may otherwise always be treated as a single type of input), while another region may output a variety of input signals or otherwise treat an input as one of a number of different input types, depending on various touch and/or force characteristics. As one example, first region 348 of touchpad 342 may output signals corresponding to both keypress inputs and force-touch inputs, while second region 350 of touchpad 342 may output signals corresponding only to force-touch inputs. It should be appreciated that alternative embodiments may permit any region to output any type of signals, but may treat those signals as a particular type regardless of any particular force and/or touch characteristics.

Figure 11:
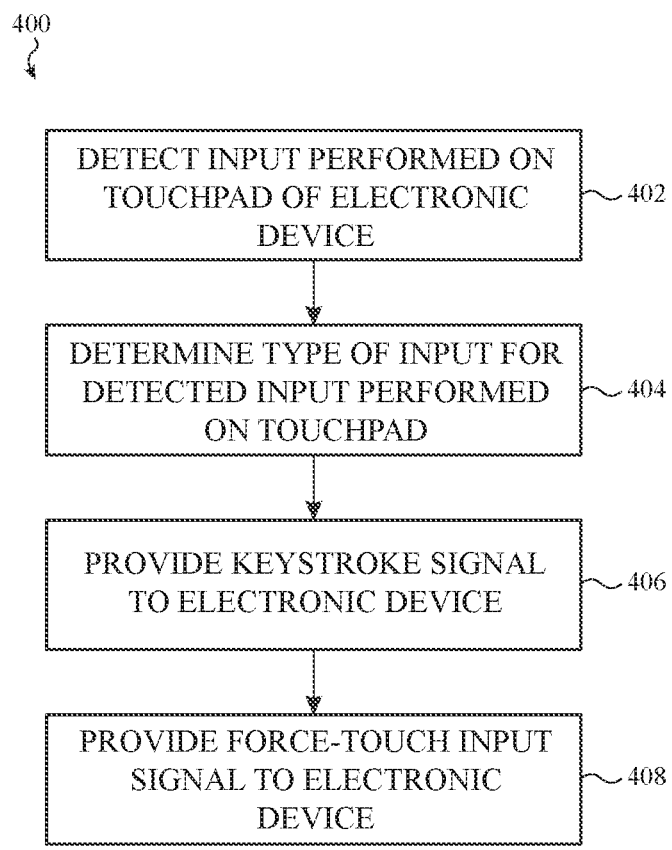
FIG. 11 depicts a flow chart of another example process for providing various signals to an electronic device using a multi-input device.

FIG. 11 depicts an example process for providing distinct signals to an electronic device. Specifically, FIG. 11 is a flowchart depicting one example method 400 for providing distinct electrical signals for interacting with an electronic device using a touchpad. In some cases, the touchpad may be utilized in an electronic device, as discussed below with respect to FIGS. 8A-10.

In operation 402, an input performed on a touchpad of an electronic device is detected. Specifically, the input performed on the touchpad is detected when a user's finger(s) and/or a distinct object or component contacts the contact surface of the touchpad. Detecting the input performed on the touchpad can also include obtaining touch characteristics relating to the input performed on the touchpad. The touch characteristics can include, but are not limited to, a force applied to the touchpad, a travel distance of the input performed on the touchpad, a travel direction of the input performed on the touchpad, a location on the touchpad for the input performed on the touchpad, and a continuous time of contact for the input performed on the touchpad. Additionally, detecting the input performed on the touchpad can include detecting two or more consecutive inputs performed on the touchpad. Where two or more consecutive inputs are performed on the touchpad, the touch characteristics can also include a detected number of inputs performed on the touchpad over a predetermined period of time.

In operation 404, a type of input for the detected input performed on the touchpad is determined. The types of inputs that can be determined include a keypress input and a touch-based gesture input (hereafter, "force-touch input"). Determining the type of input performed on the touchpad uses the touch characteristics obtained when detecting the input in operation 402. As one example, determining the type of input for the detected input performed on the touchpad can also include determining if the force applied to the touchpad exceeds a predetermined force threshold. The predetermined force threshold is a force corresponding to a keypress input for the touchpad, such that when it is determined that the force applied to the touchpad exceeds the predetermined force threshold, the detected input is determined to be a keypress input.

Additionally, determining the type of input can include determining if the travel distance of the input performed on the touchpad exceeds a threshold distance. The threshold distance for the input is a distance equal to an average movement distance of user's finger(s) (or distinct component or object) on or over the touchpad when the keypress input is performed on the touchpad. When it is determined that the travel distance of the force-touch input exceeds the threshold distance, a touch-input is detected on the touchpad.

Further, determining the type of input includes determining if the time of contact for the input exceeds a predetermined contact time threshold. The predetermined contact time threshold for the input relates to the average contact time of a user's finger(s) (or distinct component or object) on or over the touchpad when the keypress input is performed on the touchpad. As such, when it is determined that the time of contact for the force-touch input exceeds the predetermined contact time threshold, a touch-input is detected on the touchpad.

Determining the type of input can also be based, at least in part, on software, firmware, processes, and the like resident on, executed by, or incorporated into the electronic device 100. Thus, software may change thresholds or other criteria used to determine a type of input. This may permit a user to configure input detection to his or her preferences, styles, and the like.

As discussed above with respect to operation 402, two or more consecutive inputs performed on the touchpad can be detected, and touch characteristics for the consecutive inputs can include a number of inputs performed on the touchpad over a predetermined period of time. Where the number of inputs performed on the touchpad over the predetermined period of time is detected, determining the input can include determining if the detected number of inputs performed on the touchpad over the predetermined period of time equal or exceeds a predetermined consecutive input threshold. The predetermined consecutive input threshold relates to an average number of keypress inputs that are performed over a predetermined period of time when multiple (e.g., more than two) keypress inputs are performed or desired to be performed on the electronic device. When the detected number of inputs performed on the touchpad over the predetermined period of time equal or exceeds the predetermined consecutive input threshold, a keypress input is determined to be performed on the touchpad.

In operation 406, a keystroke command or signal is provided to the electronic device if the input corresponds to a keypress, as determined in operation 404. The keystroke command or signal can be associated with a typical key press, in certain embodiments.

In operation 408, a force-touch input signal is provided to the electronic device. The input signal is provided to the electronic device in response to determining a force-touch input performed on the touchpad in operation 404. The input signal is dependent on the specific force-touch input and its touch characteristics (e.g., direction, travel distance, and so on) performed on the contact surface of the touchpad and/or whether or not a specific program is operating on the electronic device at the time of performing the force-touch input on the touchpad. In non-limiting examples, the input signal can include signals for moving a cursor on a display of the electronic device or, alternatively, performing program-specific functions, signals or actions to interact with a program operating on the electronic device. The program-specific functions or signals can include, but are not limited to, mouse-clicks, scrolling, zooming, rotating, and/or selecting/highlighting.

Figure 12:
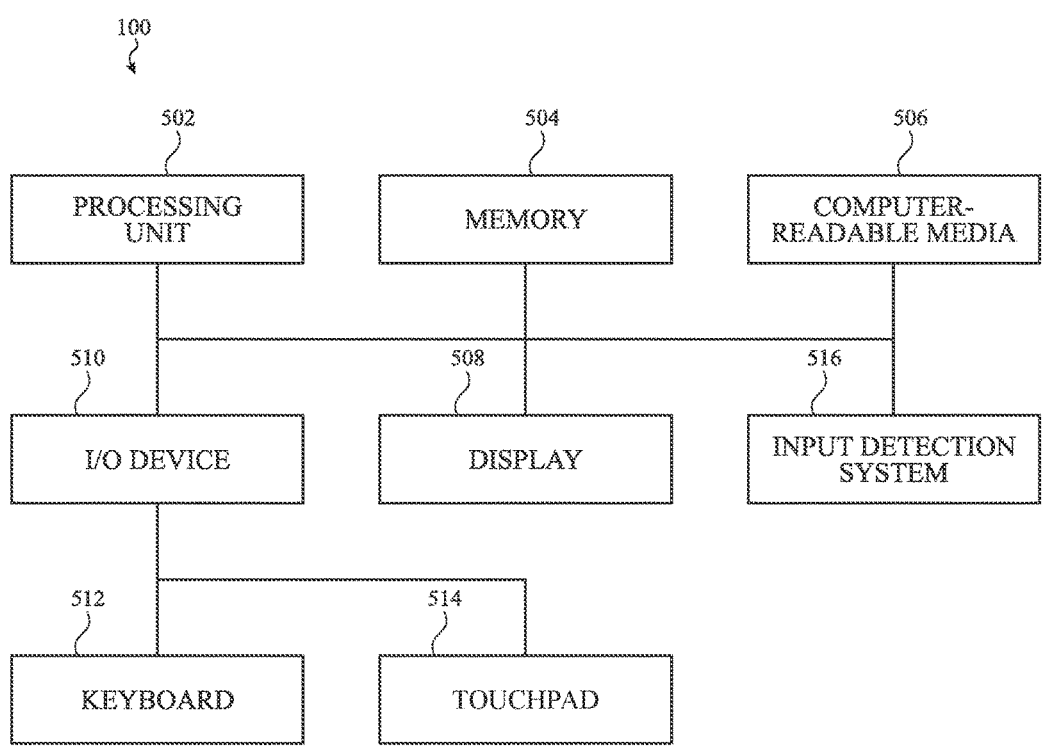
FIG. 12 depicts a system diagram of an example electronic device.

FIG. 12 depicts an example electronic device having input-output (I/O) devices and an input detection system. The schematic representation depicted in FIG. 12 may correspond to components of the portable electronic devices described above, including electronic device 100 depicted in FIGS. 1A-6B and 8A-10. However, FIG. 12 may also more generally represent other types of devices that are configured to use I/O devices and an input detection system.

As shown in FIG. 12, electronic device 100 includes a processing unit 502 operatively connected to computer memory 504 and computer-readable media 506. Processing unit 502 may be operatively connected to memory 504 and computer-readable media 506 components via an electronic bus or bridge. Processing unit 502 may include one or more computer processing units or microcontrollers that are configured to perform operations in response to computer-readable instructions. Processing unit 502 may include the central processing unit (CPU) of the device. Additionally or alternatively, processing unit 502 may include other processing units within the device including application specific integrated circuit (ASIC) and other microcontroller devices.

Memory 504 may include a variety of types of non-transitory computer-readable storage media, including, for example, read access memory (RAM), read-only memory (ROM), erasable programmable memory (e.g., EPROM and EEPROM), or flash memory. Memory 504 is configured to store computer-readable instructions, sensor values, and other persistent software elements. Computer-readable media 506 also includes a variety of types of non-transitory computer-readable storage media including, for example, a hard-drive storage device, solid state storage device, portable magnetic storage device, or other similar device. Computer-readable media 506 may also be configured to store computer-readable instructions, sensor values, and other persistent software elements.

In this example, processing unit 502 is operable to read computer-readable instructions stored on memory 504 and/or computer-readable media 506. The computer-readable instructions may adapt processing unit 502 to interact with the input detection system 516 to aid in determining a type of input provided to at least one of the I/O devices 510 and subsequently provide a corresponding input signal to interact with electronic device 100 (e.g., components on a display), as described above with respect to FIGS. 1A-11. The computer-readable instructions may be provided as a computer-program product, software application, or the like.

As shown in FIG. 12, electronic device 100 also includes display 508. Display 508 may include a liquid-crystal display (LCD), organic light emitting diode (OLED) display, light emitting diode (LED) display, or the like. If display 508 is an LCD, the display may also include a backlight component that can be controlled to provide variable levels of display brightness. If display 508 is an OLED or LED type display, the brightness of the display may be controlled by controlling the electrical signal that is provided to display elements. Programs and/or interactive elements operating on electronic device 100 are shown on display 508. The inputs performed on I/O devices 510, and the corresponding signals provided by processing unit 502 and/or input detection system 516 allow a user to interact with the programs and/or elements shown on display 508.

I/O devices 510 of electronic device 100 can include a keyboard 512 having a set of keys and/or a touchpad 514. I/O device(s) 510 are configured to detect and/or receive various types of inputs. Specifically, each I/O device 510 is configured to detect and/or receive a keypress input and a force-touch input. Each type of input provides a distinct corresponding signal for interacting with electronic device 100. Electronic device 100 can include both I/O devices 510, or can only include one I/O device 510. I/O devices 510 are operatively connected with the various components of the electronic device 100, including processing unit 502 and input detection system 516 via an electronic bus or bridge and is configured to provide input data (e.g., input characteristics) relating to the inputs performed on keyboard 512 and/or touchpad 514.

The input detection system 516 is configured to be in electrical or operative connection with I/O device(s) 510 and processing unit 502, among other components of electronic device 100. The input detection system 516, along with processing unit 502, receives input data (e.g., input characteristics) relating to the inputs performed on I/O device(s) 510 (e.g., keyboard 512 and/or touchpad 514) and determines whether the input performed on the I/O device(s) 510 is one of a keypress input or a force-touch input. Once the type of input is determined, the input detection system 516 and/or processing unit 502 can send a corresponding keystroke or input signal relating to the type of input performed on the I/O device(s) 510 to interact with electronic device 100.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable computing device comprising:
   an enclosure defining a top surface;
   a set of keys extending through the top surface, the set of keys including a depressible key having a touch-sensitive surface and configured to actuate in response to a keystroke input;
   a touchpad positioned along the top surface and along a side of the depressible key; and
   a processing unit in electrical communication with the set of keys and the touchpad,
   wherein:
     the touchpad is configured to receive a first touch input having a first travel path along a surface of the touchpad;
     the depressible key is configured to receive a second touch input having a second travel path along a surface of the depressible key; and
     the processing unit is configured to:
       determine whether the first touch input and the second touch input are portions of a single input; and
       in response to determining that the first touch input and the second touch input are portions of the single input, invoke a touch-based command corresponding to the single input.

2. The portable computing device of claim 1, wherein:
   the portable computing device is a notebook computing device;
   the set of keys defines an alpha-numeric keyboard;
   the depressible key is a space bar of the alpha-numeric keyboard; and
   the space bar is positioned adjacent to a side of the touchpad.

3. The portable computing device of claim 2, wherein:
   the space bar includes a capacitive sensor array configured to detect a location of a touch on a surface of the space bar; and
   the space bar includes a force sensor configured to detect a force applied by the touch that exceeds a programmable threshold.

4. The portable computing device of claim 3, wherein:
   the space bar is configured to invoke a keystroke command when the force applied by the touch exceeds an actuation threshold; and
   the programmable threshold is less than the actuation threshold.

5. The portable computing device of claim 4, wherein the space bar is configured to actuate a dome switch when the touch exceeds the actuation threshold.

6. The portable computing device of claim 4, wherein the actuation threshold is programmably defined.

7. The portable computing device of claim 1, wherein:
   the touch-sensitive surface of the depressible key defines multiple touch-sensitive regions; and
   each touch-sensitive region is associated with a different function.

8. The portable computing device of claim 7, wherein the multiple touch-sensitive regions define four quadrant regions of the depressible key.

9. The portable computing device of claim 1, wherein the single input is configured to control a cursor of a graphical user interface.

10. The portable computing device of claim 1, wherein the processing unit is configured to determine that the first touch input and the second touch input are portions of the single input by determining that at least a portion of the first travel path is aligned with at least a portion of the second travel path.

11. A notebook computing device comprising:
    an enclosure having an upper portion pivotally coupled to a lower portion;
    a display positioned in the upper portion of the enclosure;
    a touchpad positioned in the lower portion of the enclosure and having a first touch sensor configured to detect a first touch having a first travel path over a touchpad area;
    a keyboard positioned along a side of the touchpad and including a space bar, the space bar configured to depress and comprising:
      a second touch sensor configured to detect a second touch having a second travel path over a space bar area; and
      a dome positioned below the space bar and configured to collapse when the space bar is depressed; and
    a processing unit positioned in the lower portion of the enclosure and configured to:
      determine whether the first touch and the second touch are portions of a touch input that extends across parts of both the touchpad area and the space bar area; and
      in response to determining that the first touch and the second touch are portions of the touch input, invoke a command corresponding to the touch input.

12. The notebook computing device of claim 11, wherein the processing unit is further configured to:
    determine if the second touch is a keypress or a gesture input; and
    in accordance with the determination that the second touch is the gesture input, ignore an actuation of the space bar.

13. The notebook computing device of claim 12, wherein the determination is based on at least one of a duration of the second touch on a surface of the space bar or a duration since a previous keystroke was received by the keyboard.

14. The notebook computing device of claim 11, wherein:
the keyboard further comprises a force sensor configured to detect a force applied along the space bar area; and
in response to the force exceeding a first threshold, the notebook computing device is configured to initiate a touchpad press command; and
in response to the force exceeding a second threshold, the notebook computing device is configured to initiate a keystroke command.

15. The notebook computing device of claim 11, wherein the processing unit is configured to determine that the first touch and the second touch are portions of the touch input by determining that at least a portion of the first travel path is aligned with at least a portion of the second travel path.

16. An electronic device comprising:
an enclosure having an upper portion coupled to a lower portion;
a keyboard at least partially positioned within the lower portion of the enclosure and comprising a key configured to:
receive a first gesture input;
receive a second gesture input having a first travel path along a surface of the key; and
depress when actuated;
a touchpad positioned adjacent the key of the keyboard and configured to receive a third gesture input having a second travel path along a surface of the touchpad; and
a display at least partially positioned within the upper portion and configured to depict:
a cursor; and
a user interface for an application executing on the electronic device, wherein:
the second gesture input and the third gesture input manipulate a position of the cursor in response to a determination that the second gesture input and the third gesture input are portions of a single input; and
the first gesture input controls a function of the application.

17. The electronic device of claim 16, wherein:
the key is a space bar having a touch-sensitive surface configured to detect the first and second gesture inputs; and
the electronic device comprises a dome switch positioned below the key and configured to detect actuation of the key.

18. The electronic device of claim 16, wherein:
the determination that the second gesture input and the third gesture input are portions of the single input comprises a determination that a least a portion of the first travel path is aligned with at least a portion of the second travel path.

19. The electronic device of claim 16, wherein:
the key defines first and second regions configured to receive gesture inputs; and
the key is further configured to:
output a first signal in response to receiving the first gesture input in the first region; and
output a second signal different from the first signal in response to receiving the first gesture input in the second region.

* * * * *